(12) United States Patent
Frisken et al.

(10) Patent No.: US 7,787,720 B2
(45) Date of Patent: Aug. 31, 2010

(54) WAVELENGTH SELECTIVE RECONFIGURABLE OPTICAL CROSS-CONNECT

(75) Inventors: Steven James Frisken, Vaucluse (AU); Glenn Wayne Baxter, Hornsby Heights (AU); Hao Zhou, Sydney (AU); Dmitri Abakoumov, Lakemba (AU)

(73) Assignee: Optium Australia PTY Limited, Eveleigh, New South Wales (AU)

( * ) Notice: Subject to any disclaimer, the term of this patent is extended or adjusted under 35 U.S.C. 154(b) by 978 days.

(21) Appl. No.: 10/952,223

(22) Filed: Sep. 27, 2004

(65) Prior Publication Data

US 2006/0067611 A1 Mar. 30, 2006

(51) Int. Cl.
*G02B 6/26* (2006.01)
*G02B 5/32* (2006.01)
*H04J 14/02* (2006.01)

(52) U.S. Cl. .............. 385/16; 385/15; 385/17; 385/18; 385/19; 385/20; 385/21; 385/22; 385/23; 385/24; 385/25; 385/33; 359/15; 398/81

(58) Field of Classification Search ............ 385/15–25, 385/33; 359/39, 15; 398/81
See application file for complete search history.

(56) References Cited

U.S. PATENT DOCUMENTS

| | | | |
|---|---|---|---|
| 5,132,824 A | 7/1992 | Patel et al. | |
| 5,414,540 A * | 5/1995 | Patel et al. | 349/196 |
| 5,682,262 A | 10/1997 | Wefers et al. | |
| 5,768,242 A | 6/1998 | Juday | |
| 6,434,291 B1 | 8/2002 | Kessler et al. | |
| 6,529,307 B1 | 3/2003 | Peng et al. | |
| 6,549,697 B1 | 4/2003 | Bigo et al. | |
| 6,668,115 B2 | 12/2003 | Lin et al. | |
| 6,680,797 B2 | 1/2004 | Juday | |
| 6,711,316 B2 | 3/2004 | Ducellier | |
| 6,798,941 B2 * | 9/2004 | Smith et al. | 385/18 |

(Continued)

FOREIGN PATENT DOCUMENTS

JP 2001-160784 6/2001

(Continued)

OTHER PUBLICATIONS

"Office Action" for Japanese Patent Application No. 2007-557274, Japanese Patent Office, Japan.

(Continued)

*Primary Examiner*—Brian M. Healy
*Assistant Examiner*—Guy G Anderson
(74) *Attorney, Agent, or Firm*—Kurt Rauschenbach; Rauschenbach Patent Law Group, LLP

(57) ABSTRACT

An optical coupling device including: at least a first input port for delivering an optical input signal beam that includes a plurality of wavelength channels; at least a first optical output port for receiving an optical output signal beam; a wavelength dispersion element for spatially separating the plurality of wavelength channels in the optical input signal beam to form a plurality of spatially separated wavelength channel beams; an optical coupling device for independently modifying the phase of each of the spatially separated wavelength channel beams such that, for at least one wavelength channel beam, a selected fraction of the light is coupled to the first output port and a fraction of the light is coupled away from the first output port.

25 Claims, 25 Drawing Sheets

U.S. PATENT DOCUMENTS

| | | |
|---|---|---|
| 6,956,687 B2 | 10/2005 | Moon et al. |
| 7,177,496 B1* | 2/2007 | Polynkin et al. ............... 385/24 |
| 7,236,660 B2* | 6/2007 | Ducellier et al. ............... 385/24 |
| 2001/0009596 A1* | 7/2001 | Solgaard et al. ............... 385/18 |
| 2001/0050787 A1* | 12/2001 | Crossland et al. ............. 359/15 |
| 2002/0131687 A1 | 9/2002 | Wilde |
| 2003/0021526 A1 | 1/2003 | Bouevitch |
| 2003/0095305 A1 | 5/2003 | Kewitsch |
| 2003/0175030 A1 | 9/2003 | Chen et al. |

FOREIGN PATENT DOCUMENTS

| | | |
|---|---|---|
| JP | 2002-335212 | 11/2002 |
| WO | 02/056521 A | 7/2002 |

OTHER PUBLICATIONS

Sawada, et al., WDM Transmission System Using Dispersion Slope Management, The Institute of Electronics Information And Communication Engineers, Jul. 1997, 6 pages, Yamanashi University, Yamanashi, Japan.

"Supplementary European Search Report" For EP Application No. 05787093.3-1234, Oct. 19, 2009, 5 Pages, European Patent Office, Rijswijk, The Netherlands.

* cited by examiner

'Bar' State

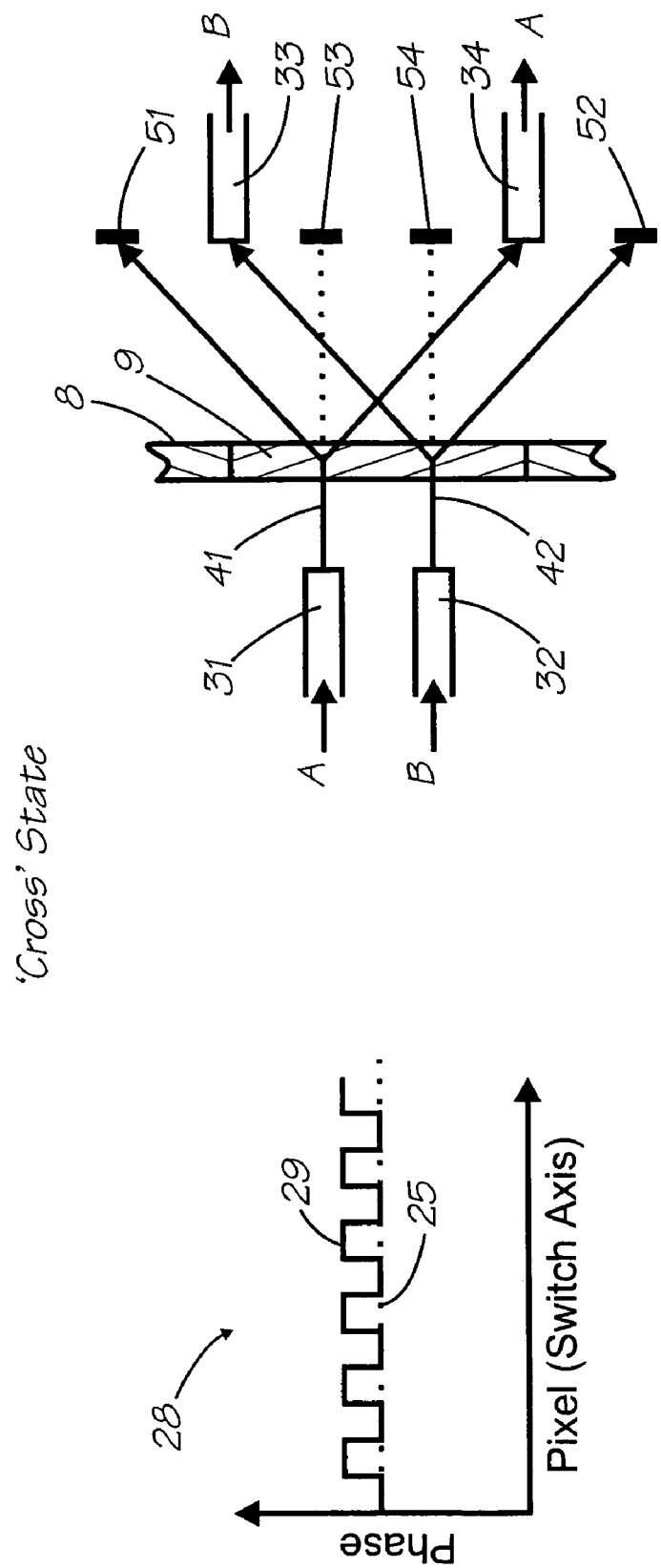

'Null' State

| Ref. | Channel | Is channel present in trace ...? | | | | Therefore, the channel is in the cross-connect state ... |
| --- | --- | --- | --- | --- | --- | --- |
| | | Fig. 33 Coupling ports 601 → 603 (Trace 810) | Fig. 34 Coupling ports 601 → 606 (Trace 820) | Fig. 35 Coupling ports 602 → 603 (Trace 830) | Fig. 36 Coupling ports 602 → 606 (Trace 840) | |
| 800 | $\lambda_0$ | No | No | No | No | [601→∅ : 602→∅] |
| 801 | $\lambda_1$ | Yes | No | No | No | [601→603 : 602→∅] |
| 802 | $\lambda_2$ | No | No | No | Yes | [601→∅ : 602→606] |
| 803 | $\lambda_3$ | No | Yes | No | No | [601→606 : 602→∅] |
| 804 | $\lambda_4$ | No | No | Yes | No | [601→∅ : 602→603] |
| 805 | $\lambda_5$ | Yes | No | No | Yes | 'Bar': [601→603 : 602→606] |
| 806 | $\lambda_6$ | Yes | No | No | Yes | [601→603 : 602→606] |
| 807 | $\lambda_7$ | No | Yes | Yes | No | 'Cross': [601→606 : 602→603] |
| 808 | $\lambda_8$ | No | Yes | Yes | No | [601→606 : 602→603] |

*FIG. 37*

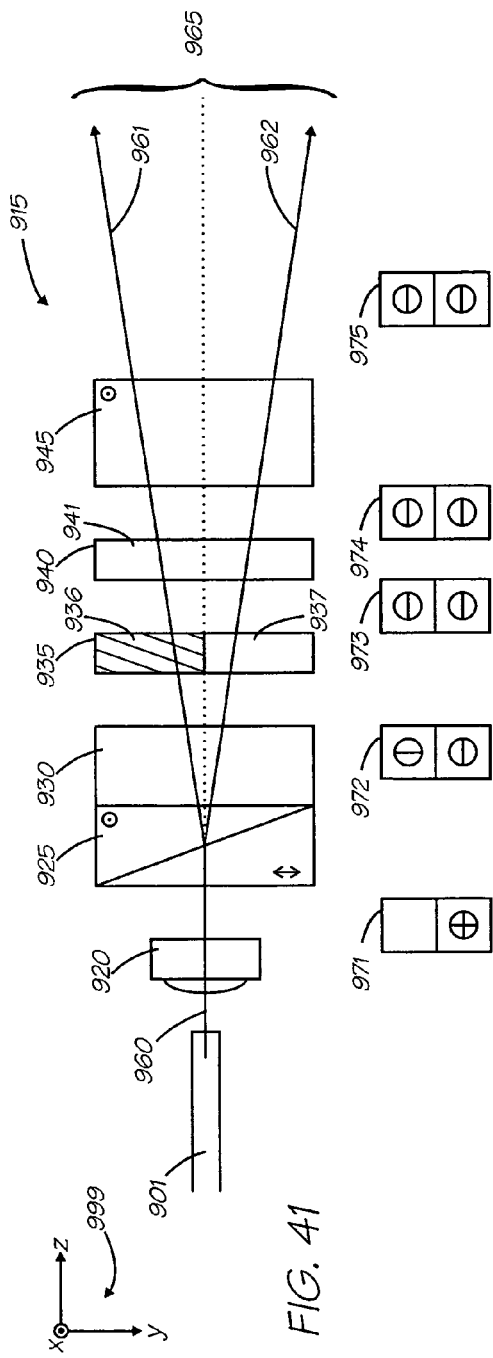
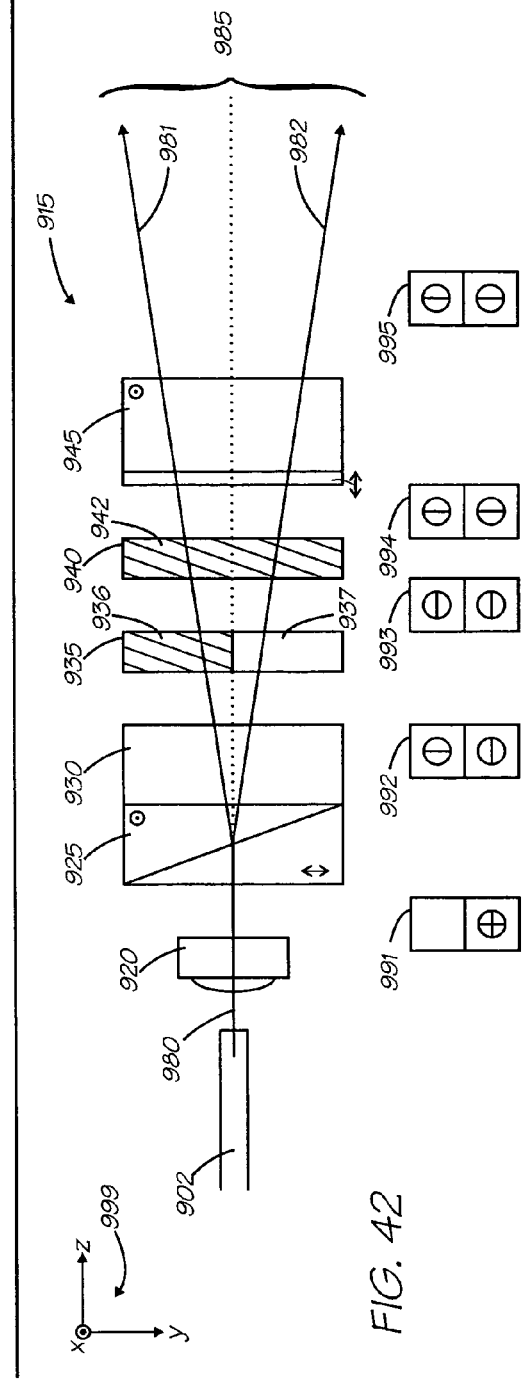
FIG. 41
FIG. 42

WAVELENGTH SELECTIVE RECONFIGURABLE OPTICAL CROSS-CONNECT

FIELD OF THE INVENTION

The current invention relates to optical communications network systems, and in particular a device and method that provides for a reconfigurable wavelength selective reconfigurable optical cross-connect switch.

BACKGROUND OF THE INVENTION

The recent growth in the demand for broadband services has resulted in a pressing need for increased capacity on existing communication channels. The increased bandwidth of fiber optic communication networks is still often insufficient to cope with this demand without utilizing the ability of these fibers to carry large numbers of individual communication channels, each identified by the particular wavelength of the light. This technique is known as dense wavelength division multiplexing (DWDM). The disadvantage of this technique is that the increasing density of wavelength channels places increasing demand on network functionality for connecting the individual channels to individual destination points on a dynamic basis, and for the ability to add or drop an individual wavelength channel into or out of the optical signal. Currently these functions are primarily performed by electronic techniques but the demand for increased network speed calls for these functions to be performed in the optical domain.

In optical communications systems, the use of wavelength selective switching for applications of optical cross-connects (OXC) has attracted much interest because of the goal of fully flexible, networks where the paths of each wavelength can be reconfigured to allow arbitrary connection between nodes with the capacity appropriate for that link at a particular point in time. Although this goal is still valid, it is clear that optical networks will evolve to this level of sophistication in a number of stages—and the first stage of the evolution is likely to be that of a reconfigurable add/drop node where a number of channels of an input signal can be dropped and added from the main path, whose number and wavelength can be varied over time—either as the network evolves or dynamically as the traffic demands vary. The second stage requires that the reconfigurable add/drop node be expanded to include an arbitrary number of input ports, and include the ability to switch any wavelength channel from any of the input ports to any of the output ports without cross-talk from channels of the same wavelength on any of the other input ports appearing at an output port.

The operation of optical switches with one input and two output ports (1×2) or vice versa is well known in the field of telecommunications networks and forms a basic building block for more complex systems, for example, a switch with two inputs and two outputs (2×2) known as an optical cross connect (OXC) can be constructed by a cascaded arrangement of six 1×2 optical switches. Similarly a 3×3 OXC can be designed using three 2×2 OXC switches, a 4×4 OXC using six 2×2 OCX switches, and so on.

These systems, however, generally route all the channels contained in the signal appearing on the input ports to one of the output ports, often without the ability to block an input completely. In order to selectively route individual wavelength channels contained in either of the signals appearing at the input ports, complex design architectures are needed to demultiplex the input signals, reroute the individual wavelength channels using a separate cross connect switch for each wavelength, and remultiplex the rerouted channels onto the output port. This process increases dramatically in complexity with the number of wavelength channels contained in the input signals as is seen for example in U.S. Pat. Nos. 6,658,175 and 6,678,473.

SUMMARY OF THE INVENTION

An object of the present invention is to provide a system and method for a reconfigurable wavelength selective OXC switch including . . . .

Consistory Clause

The present invention relates to a reconfigurable all-optical wavelength selective OXC device which provides a full-function non-blocking architecture for arbitrarily routing a wavelength channel contained in an optical input signal to a desired output port. The device can also be configured to selectively block any wavelength channel on any of the input ports simply by not directing it to an output port.

In accordance with a first aspect of the present invention, there is provided an optical coupling device including: at least a first input port for delivering an optical input signal beam, where the input beam includes a plurality of wavelength channels; at least a first optical output port for receiving an optical output signal beam; a wavelength dispersion element for spatially separating the plurality of wavelength channels in the optical input signal beam to form a plurality of spatially separated wavelength channel beams; an optical phased-matrix coupling device for independently modifying the phase of each of the spatially separated wavelength channel beams such that, for at least one wavelength channel beam, a selected fraction of the light is coupled to the first output port and a fraction of the light is coupled away from the first output port.

The optical coupling device preferably includes at least two output ports wherein a selected fraction of the light in at least one wavelength is coupled to the first output port and a fraction of the light is coupled to a second output port. Preferably, the optical coupling device also includes at least two input ports for delivering a plurality of input signal beams, where each beam comprises of a plurality of wavelength channels, and the optical phased-matrix coupling device is configured to couple a particular wavelength channel from any of the input signal beams to either a selected one of the plurality of output ports or at least two of the output ports simultaneously.

Preferably, the optical phased-matrix coupling device is configured to couple a particular wavelength channel from any of the input signal beams to a null port in accordance with requirements. The light directed to the null state is preferably collected by a further output port. More preferably, the optical phased-matrix coupling device is divided into a plurality of elongate zones, each zone for receiving one of the wavelength channels contained in the input signal beams. Each zone preferably independently modifies the phase of a corresponding one of the spatially separated wavelength channel beams. Each zone of the optical phased-matrix coupling device preferably includes a plurality of independently addressable pixels where the pixels are manipulated in a predetermined manner so as to manipulate the phase front of a wavelength channel beam striking a corresponding one of the zones. The phase manipulation performed in each zone is preferably configurable to simultaneously provide directional routing and attenuation capabilities of the wavelength channel beams. The phased-matrix coupling device is preferably a spatial light modulator. More preferably, the phased-matrix coupling device is a liquid crystal display device having a series of light modulating pixels formed thereon.

Preferably, the spatially separated wavelength channel beams received by the phased-matrix coupling device are in the form of wavelength separated elongated bands, preferably aligned in the plane of the zones on the phased matrix coupling device. More preferably, the wavelength separated elongated bands are substantially collimated along their major axis and substantially focused along their minor axis. The ratio of the width of the major axis to the width of the minor axis of the bands is preferably equal to or greater than 5. Preferably, the phased-matrix coupling device is in the telecentric plane of the wavelength channel beams in the focused axis.

Preferably, the wavelength dispersion element is a diffraction grating. The pitch of the grating is greater than 1600 lines/mm. More preferably, the wavelength dispersion element is formed by the combination of a diffraction grating and a optically transparent material with refractive index greater than 1, wherein the transparent material has a surface that configured to receive the optical input signal beams and to disperse the wavelength channels with substantially opposite angular dependence with respect to the grating. The transparent material is preferably a prism. Preferably, the diffraction grating and the prism are coupled. More preferably, the diffraction grating and the prism are coupled to form a grism. The grism is preferably aligned in the near-Littrow condition.

Preferably, the optical signals traversing the wavelength dispersion element have substantially aligned polarization. More preferably, the optical coupling device includes polarization manipulation elements to separating light from the optical signal input ports into first and second polarized beams of predetermined polarizations and substantially equalizing the polarizations of the polarized beams to be substantially aligned. Even more preferably, the light emitted from the optical signal ports passes through a numerical aperture modifying means before traversing the polarization manipulation element.

Preferably, the optical coupling device includes path equalization elements such that the distance travelled by each of the polarized beams through the device is substantially equal. More preferably, the first and second polarized beams are angularly separated.

In accordance with a second aspect of the present invention, there is provided a method of forming an optical coupling device including the steps of: receiving input optical signal beams from at least first and second optical input ports, where each optical signal contains a plurality of wavelength channels; spatially separating the wavelength channels by a wavelength dispersion element to form a plurality of spatially separated wavelength channel beams; projecting each of the spatially separated wavelength channel beams onto an independent elongated zone defined on an optical phased-matrix coupling device; independently directing individual ones of the spatially separated wavelength channel beams from each input port to one of at least a first and second optical output ports, or to a null state by modifying the phase of the wavelength channel beam.

Preferably, the optical phased-matrix coupling device is divided into a plurality of elongate zones, each zone for receiving one of the wavelength channel beams contained in any of the input signal beams. More preferably, each zone of the phased-matrix coupling device independently modifies the phase of the received spatially separated wavelength channel beam.

Preferably, each zone of the optical phased-matrix coupling device includes a plurality of independently addressable pixels with the pixels being manipulated in a predetermined manner so as to manipulate the phase front of a wavelength channel beam striking a corresponding zones. More, preferably, the, phased-matrix coupling device is a spatial light modulator. Even more preferably, the phased-matrix coupling device is a liquid crystal display device having a series of light modulating pixels formed thereon.

In accordance with a third aspect of the present invention, there is provided an optical coupling device including wavelength dispersion elements and a coupling means, with the coupling means able to modify an input signal such that the optical power in a selected wavelength region can be coupled in a controllable ratio between at least first and second output ports.

In accordance with a fourth aspect of the present invention, there is provided an optical coupling device including wavelength dispersion elements and a coupling means, with the coupling means able to modify an input signal such that the optical power in a selected wavelength region can be coupled in a controllable ratio between at least a first output port and a null port.

In accordance with a fifth aspect of the present invention, there is provided an optical processing device including at least a first optical input port, wavelength dispersion means, polarization separation means, polarization manipulation means, an optical phased-matrix processing means and at least a first optical output for processing wavelength signals contained in an optical input signal such that, for at least one wavelength, a selected fraction of the light is coupled to the first output port and a fraction of the light is coupled away from the first output port.

The optical processing device preferably includes a plurality of optical input ports and a plurality of optical output ports. The wavelength dispersion means preferably includes a series of optical power elements and an optically dispersive element such that the wavelength signals are transformed into substantially spatially separated elongate bands for processing by the optical phased-matrix processing means.

In accordance with a sixth aspect of the present invention, there is provided an optical device including: a linear array of optical ports, wherein at least one port is configured to launch an input signal into the optical device; a polarization manipulation element to form two angularly separated beams from the input signal wherein the polarization of the beams is substantially orthogonal, and such that the axis of the angular separation is substantially orthogonal to the axis of the array of optical ports; and an optical imaging system such that the polarization states substantially spatially overlap at an optical modulation device.

The optical modulation device preferably is an optical phase manipulation device, and is divided into a plurality of zones.

Preferably, the input signal includes a plurality of wavelength channels such that the angularly separated beams each include a plurality of wavelength channels, and each angularly separated beam being further angularly multiplexed with respect to wavelength by an optical dispersion element to form first and second groups of wavelength multiplexed angularly separated beams.

Preferably, the first and second groups of wavelength multiplexed angularly separated beams are directed by the optical elements such that they substantially overlap on one of the zones on the phase manipulation device.

The optical device also preferably includes a means of substantially equalizing the optical path lengths of the angularly separated beams. Preferably, the path equalizing means includes birefringent optical elements, prisms, transparent optical materials with a refractive index greater than 1, optical power elements, and optical reflecting elements.

In accordance with a seventh aspect of the present invention, there is provided a method of manipulating a first optical input signal formed from a series of wavelengths, the method including the steps of: spatially separating the first optical input signal into a series of spatially separated wavelength signals; utilizing at least one variable strength phase grating structure to manipulate the direction of propagation of the wavelength signals, where the manipulation includes splitting a wavelength signal into at least two sub-signals having differing directions of propagation; and, depending on the setting of the variable phase grating structure, combining predetermined ones of the spatially separated wavelength signals together to form an output signal.

Preferably, the step of manipulating the direction of propagation further includes aligning the direction of propagation of the sub-signals with one of a series of output ports in accordance with requirements. The differing direction of propagation of the sub-signals preferably are substantially symmetrical around a central axis and the varying of the direction of propagation of the sub-signals includes varying the angle of propagation relative to the central axis.

Preferably, the variable phase grating structure is a repeating pattern. More preferably, the variable phase grating structure includes a first high frequency repeating pattern and a second lower frequency repeating pattern. More preferably, the variable phase structure includes a first high frequency pattern determining a first overall direction of propagation of the sub-signals and a second lower frequency pattern determining a second direction of propagation of component sub-signals relative to the first overall direction of propagation. The variable phase grating structure is preferably a liquid crystal display device having a series of independently addressable pixel elements.

In accordance with an eighth aspect of the present invention, there is provided an optical coupling device including: at least two optical ports for carrying input signal beams into the optical device for manipulation, with each beam including a plurality of wavelength channels; polarization manipulation means to modify the polarization state of signal beams from select ones of the optical ports to form polarized beams; spatial separating means for spatially separating the polarized input signal beams to form at least a first and a second group of beams; a wavelength dispersion element for spatially separating the plurality of channels in the first and second groups of optical signal beams, such that the first and second groups of signal beams each include a plurality of spatially separated wavelength channel beams; an optical phased-matrix coupling means for independently modifying the phase of each group of the spatially separated wavelength channel beams independently such that selected wavelength channels from select ones of the optical input ports are coupled to at least one optical output port.

Preferably, the first group of input signal beams is projected to a first region of the phased-matrix coupling means and the second group of input signal beams is projected to a second region of the phased-matrix coupling device.

Preferably, the optical coupling device includes at least two output ports and each wavelength channel contained in either of the first or second group of input signals is coupled to at least one of the output ports by the optical phased-matrix coupling means.

Preferably, the optical coupling device includes a passive polarization combining means such that the wavelength channel beams impinging on either of the first or second regions are coupled to any of the output ports in accordance with requirements.

Preferably, the wavelength channel beams impinging on either of the first or second regions are coupled to a combination of the output ports in accordance with requirements.

Preferably the optical coupling device includes at least four input ports and at least four output ports. More preferably, the optical coupling device includes a plurality of optical input ports. More preferably still, the optical coupling device includes a plurality of optical output ports.

BRIEF DESCRIPTION OF THE FIGURES

Further features and advantages of the present invention will become apparent from the following detailed description of preferred embodiments of the invention, taken in combination with the appended drawings in which:

FIG. 6A is an example of a fifth phase ramp profile to generate a fifth switch function;

FIG. 6B is a schematic drawing of the device of FIG. 1 in a fifth switching state;

FIG. 37 is a table summarizing the experimental results of FIGS. 33 to 36;

FIG. 41 is a top plan view of the polarization diversity optics of FIG. 39 showing the beam path and the polarization state diagrams for the input beam from the first input port of the device;

FIG. 42 is a top plan view of the polarization diversity optics of FIG. 39 showing the beam path and the polarization state diagrams for the input beam from the second input port of the device;

DESCRIPTION OF PREFERRED AND OTHER EMBODIMENTS

Figure 1:
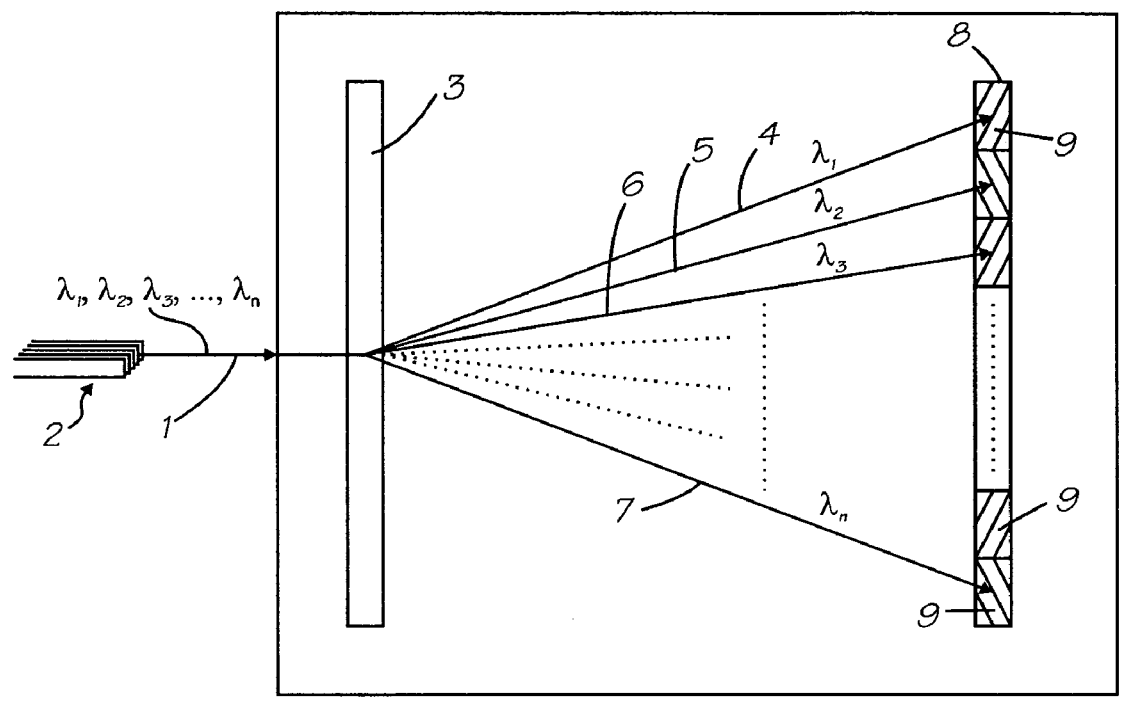
FIG. 1 is a block schematic of an embodiment of an optical cross connect in accordance with the present invention.

The reconfigurable wavelength selective OXC device includes at least two input ports, a number of output ports at least equal to the number of inputs and a means for routing at least one optical channel, distinguished by its center wavelength, contained in an input signal to at least one output. The optical channel is usually distinguished by its center wavelength, however this is not the only method available.

The routing means includes:

a plurality of optical ports for carrying optical signal beams;

a wavelength dispersion element for spatially separating the plurality of wavelength channels contained in the optical signal beams;

method for creating an optical overlap between the projections from at least three selected optical ports for coupling a particular wavelength channel originating at one port to at least two other ports, where one, all or none of the other ports corresponds to a null state.

The device in the preferred embodiment is a reconfigurable wavelength selective OXC and includes:

A series of optical ports which can include optical fiber arrays;

A series of optical ports where the optical fiber arrays are single mode fibers;

A series of optical ports where the optical fiber array includes at least a first input port, and a first output port;

A series of optical ports where the optical fiber array includes a second input port and a second output port;

A series of optical ports where the optical fiber array includes a plurality of input ports, and a plurality of output ports;

A series of optical ports where the optical fiber array includes a plurality of null ports;

A series of optical power elements which can include spherical or cylindrical microlens arrays for altering the numerical aperture of each of the optical ports;

Optical power elements including cylindrical lenses with a first focal length and cylindrical mirrors with a second focal length for projecting light from the ports on the optical phased-array coupling means comprising at least a spatially separated first group of spatially dispersed wavelength channels, each wavelength channel being substantially collimated in one axis and substantially focused in the orthogonal axis;

Polarization diversity elements including a birefringent walk-off crystal composite λ/2 waveplates for 1550 nm light, compensating birefringent wedges, and/or faraday rotators;

An optical dispersion element which is a carpenter's prism (also known as a grism) operating in the reflective mode at near Littrow condition, with a wedge angle substantially at Brewster's angle of the incident light for dispersing the wavelength channels and correcting for path differences and conical diffraction effects; and An optical phased matrix coupling (OPMC) means providing 2-dimensional optical phase only or phase and optical amplitude such as can be provided by a liquid crystal on silicon (LCOS) spatial light modulator (SLM).

The following description relates to a device for implementing a method of dispersing a plurality of optical wavelength channels contained in an optical signal and creating an overlap for a particular selected wavelength channel between an input port and at least two output states. The output states can be defined by a choice of two possibilities;

they can coincide either with a single output port or multiple output ports for switching or routing of the selected wavelength channel; or alternatively the output states can coincide with a null state of the device where the selected wavelength channel is either lost to the device or output on a designated null port. The light on this null port can be detected for monitoring purposes if desired.

It is possible with this device to also dynamically configure the fraction of light appearing at any of the output states by adjusting the coupling efficiency accordingly.

An embodiment of the current device includes a method for constructing a reconfigurable OXC device that can operate on individual wavelength channels of an optical signal. The OXC created using this method operates as a 1×N OXC where the light of a particular wavelength from one input port can be output on many output ports N where N=0, 1, 2, 3, . . . . When N=0, the light is lost to the device. Similarly, when N is greater than 0, any or all of the output ports can be designated as a null port where the light is either blocked completely and lost, or directed to for example, a detector for monitoring purposes. Since the device includes the ability for configuring the fraction of light at a particular output port, it is possible to direct only a small fraction of the light to the null port and thus maximize the light on the desired output port(s). This ability is also applicable to other functions such as attenuation of one output or dynamic channel equalization (DCE) across the wavelength channels directed to a particular output. Conversely, the reconfigurable OXC can operate as an N×1 device where light from N inputs can be combined onto a single output.

FIG. 1 shows a schematic representation of an embodiment of the 1×N wavelength selective OXC in a reflective configuration. A signal beam 1 is input to the device on one of a plurality of optical ports shown as an optical array 2. The signal beam contains a plurality of wavelength channels $\lambda_1$, $\lambda_2$, $\lambda_3$, . . . , $\lambda_n$ and is projected onto an optical dispersion element 3 where the signal beam is split into a plurality beams 4-7 angularly separated with respect to wavelength. The beams are then projected to an optical phased-matrix coupling (OPMC) device 8. The OPMC is divided into a series of zones 9, each zone corresponding to one of the wavelength separated beams. The zone forms an independently controllable region which modifies the phase of its respective wavelength channel in the manner shown schematically in FIGS. 2-6. The light is reflected from the OPMC and, depending on the phase modification, is directed to any one of the optical ports contained in the array 2.

FIGS. 2A, 3A, 4A, 5A and 6A give an example of a phase profile along a particular zone 9 in the switching plane of the OPMC 8. FIGS. 2B, 3B, 4B, 5B, and 6B show schematically the resulting modification of the light path of two input signals A (41) and B (42) through the OXC device. In these figures, like elements have been given corresponding reference numbers. Signals A (41) and B (42) are input to the device on respective input ports 31 and 32 and are assumed to be of the same wavelength such that the optical system (not shown) directs them to the same zone 9 of the OPMC device 8.

Figure 2A:
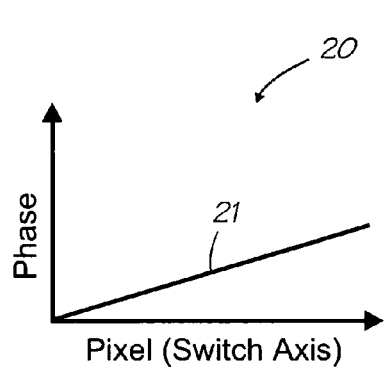
FIG. 2A is an example of a first phase ramp profile to generate a first switch function.
Figure 2B:
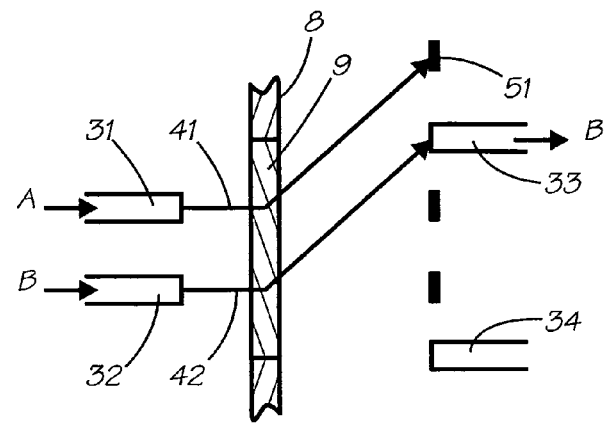
FIG. 2B is a schematic drawing of the device of FIG. 1 in a first switching state.

FIG. 2A shows a first example 20 of a phase profile 21 to perform the "shift-up" action shown in FIG. 2B. Phase profile 21 can include a modulo $2\pi$ profile since it is recognized that a phase shift of $2\pi$ is equivalent to a phase shift of zero ie each time the required phase shift reaches $2\pi$, it is reset to a phase shift of zero and the ramp repeated. FIG. 2B shows a 2×2 OXC device with input ports 31 and 32 and output ports 33 and 34. Zone 9 of the OPMC 8 presents the phase profile 21 (of FIG. 2A) to signals A and B and modifies their phase such the direction of propagation is altered. In this situation, signal A (41) is directed to a null port 51 where it is blocked and signal B (42) is directed to the first output port 33.

Figure 3A:
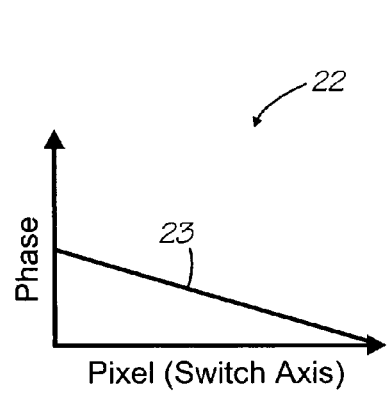
FIG. 3A is an example of a second phase ramp profile to generate a second switch function.
Figure 3B:
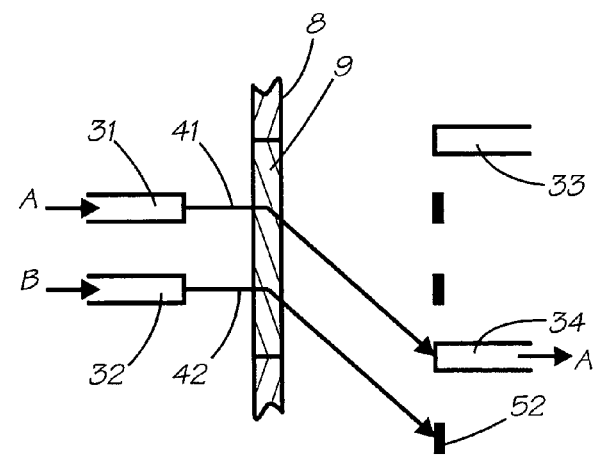
FIG. 3B is a schematic drawing of the device of FIG. 1 in a second switching state.

The complementary action to FIGS. 2A and 2B is the "shift-down" function shown in FIGS. 3A and 3B. FIG. 3A show a phase profile 23 which, when applied to the zone 9 of the OPMC device in FIG. 3B, the propagation direction of the two input signals A and B is altered such that signal A is directed to the second output port 34 and signal B is directed to a null port 52 where it is blocked.

Figure 4B:
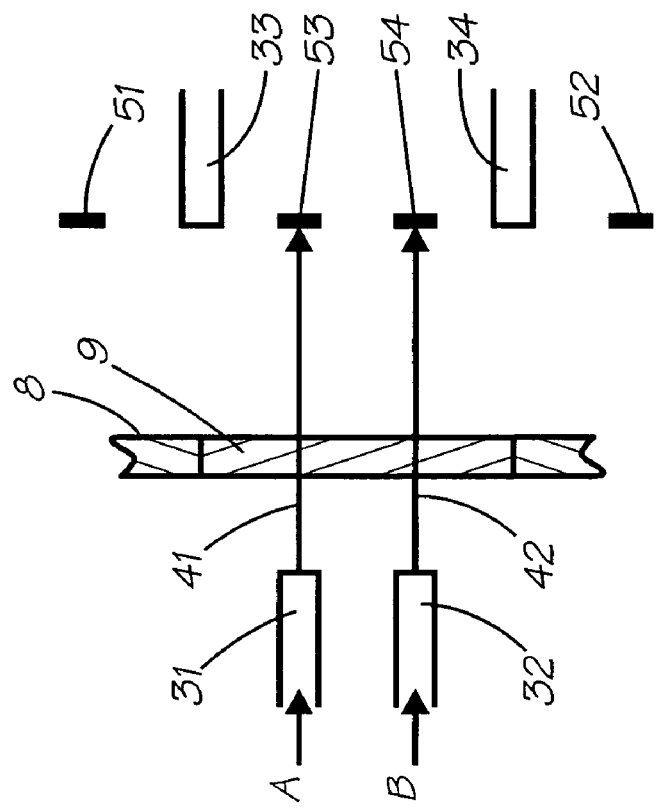
FIG. 4B is a schematic drawing of the device of FIG. 1 in a third switching state.
Figure 4A:
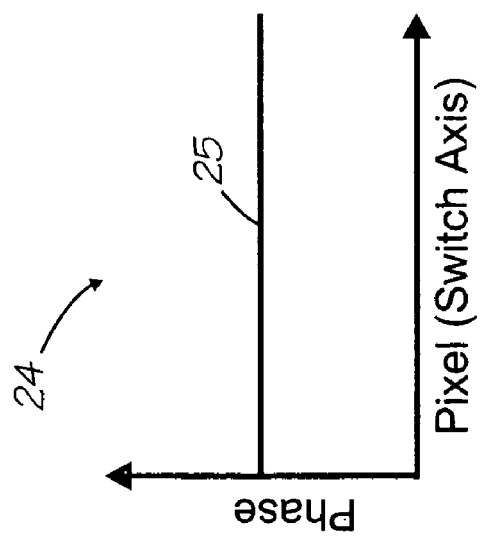
FIG. 4A is an example of a third phase ramp profile to generate a third switch function.
Figure 5B:
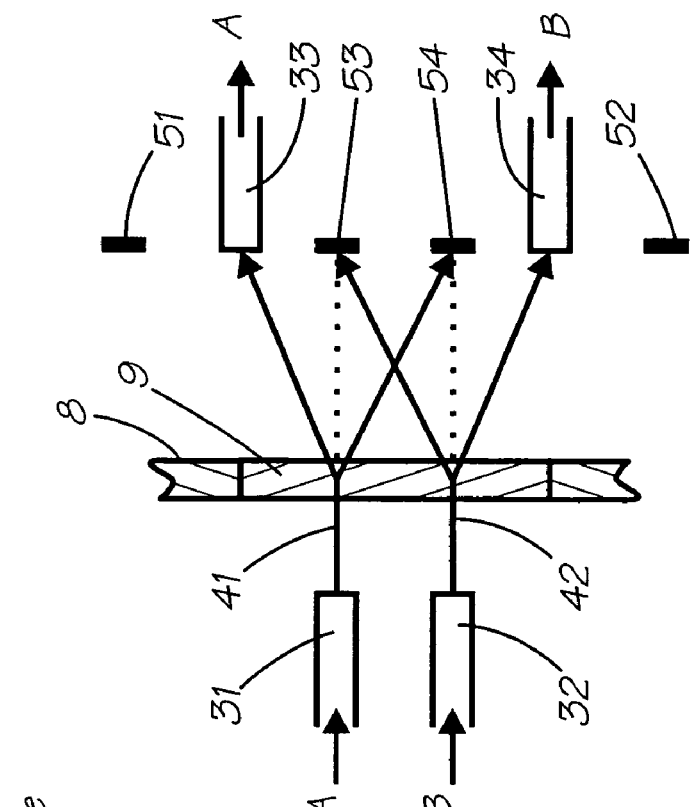
FIG. 5B is a schematic drawing of the device of FIG. 1 in a fourth switching state.
Figure 5A:
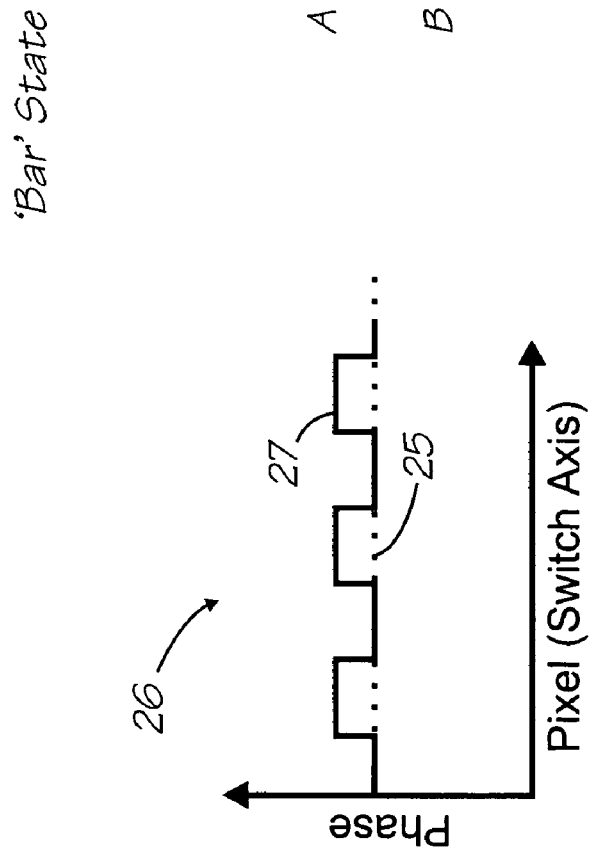
FIG. 5A is an example of a fourth phase ramp profile to generate a fourth switch function.

Depending on the particular layout of the optical system, a phase profile (which can include modulo $2\pi$ profiles) can be found which directs the light from both the input ports to null ports such as for example a phase profile 25 (of FIG. 4A) which, as shown in FIG. 4B, directs the light 41 from the first input port 31 to null port 53, and the light 42 from the second input port to the null port 54. In this situation, no light from signal A or B appears on either of the output ports 33 or 34.

However, if a periodic modulation is added to the phase profile 25 to give a resulting phase profile 27 (of FIG. 5A), the light impinging on this profile is split between multiple diffraction orders (FIG. 5B) with a known angular separation from the original beam path when no modulation is present. With the example phase profile (27 of FIG. 5A) having suitable modulation depth and period, the light 41 from the first input port 31 is split into two main beams, being the +1 and −1 diffraction orders. The first beam is directed to the first output port 33 and the second to null port 54. Similarly, light 42 from the first input port 32 is split into two beams (with the same angular separation as light 41 from the first input port) such that the first beam is directed to null port 53 and blocked, while the second beam is directed to the second output port 34. In this situation, signal A from the first input port is output on the first output port and signal B from the second input port is output on the second output port. This is denoted as the 'Bar State' of a 2×2 OXC device.

The 'Cross State' of an OXC device is defined such that a signal A from the first input port of the OXC is output on the second output port, and a signal B from the second input port is output on the first output port. This state is achieved with the phase profile 28 shown in FIG. 6A. The signals A and B are again sent to the null ports 53 and 54 respectively by a phase profile 25 and a certain periodic modulation added to give the phase profile 29. As can be seen in FIG. 6B the shorter period of the periodic modulation causes the signal beams to be split with a greater angular separation. The amount of angular separation can be selected such that signal A (41) is split into two main beams, the first of which is directed to null port 51 and blocked, and the second directed to the second output port 34. Similarly, signal B is split in to main beams that are directed to the first output port 33 and null port 52 respectively. Phase profiles 27 and 29 can include modulo $2\pi$ phase profiles.

Figure 7:
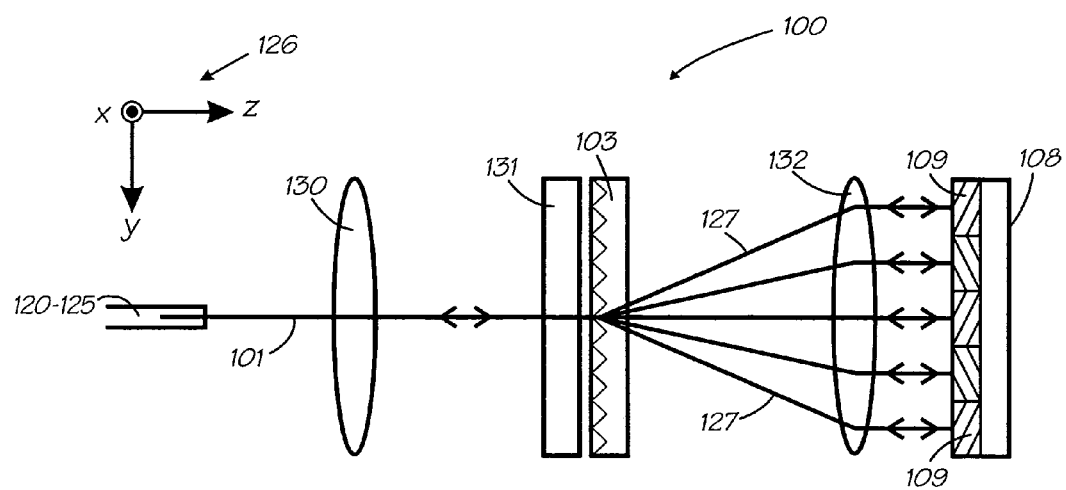
FIG. 7 is a schematic view of an embodiment of the reconfigurable wavelength selective cross connect device in the dispersion plane.
Figure 8:
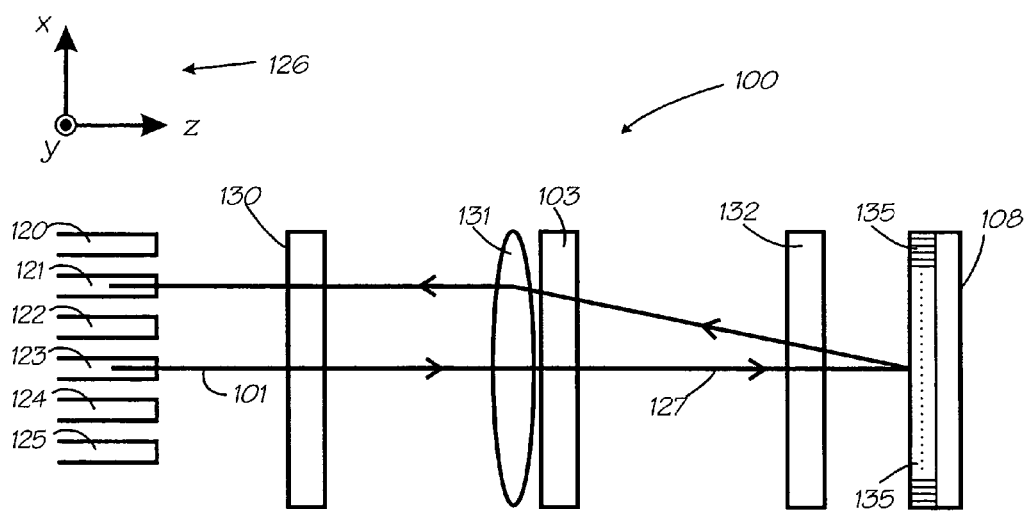
FIG. 8 is a schematic view of an embodiment of the reconfigurable wavelength selective cross connect device in the switching plane.

The principles of FIG. 2 to FIG. 6 can also be used in a reflective mode device. FIGS. 7 and 8 show schematic representations of a reconfigurable wavelength selective OXC device 100 operating in reflective mode in top plan view and side plan views respectively. In this aspect, the top view of FIG. 7 is the dispersion plane and the side view of FIG. 8 is the switching plane. Device 100 includes an array of optical input ports 120-125 for carrying optical signals. The input ports are arrayed in the switching plane.

As is known for a collimated beam, an angular deflection of the beam obtained by changing the order of a reflective diffraction grating will have the effect of translating the focus of the beam. If an optical train is established to be telecentric then this translation is achieved without affecting the coupling efficiency and so can be coupled effectively into a second port located at a given translation from the first post such as is provided in the case of a fiber array.

The input signal 101 in this example is initially input to the device along optical port 123 and is collimated by cylindrical lens 130 in the dispersion plane. Lens 130 does not affect the beam 101 in the switching plane and it continues to diverge in this plane until it reaches a second cylindrical lens 131 where it is collimated. The beam is then incident on a wavelength dispersion element 103 operating in this case in the transmissive mode. The dispersion element angularly separates the wavelength channels contained in input signal 101 in the dispersion plane into a plurality of monochromatic beams 127 as seen in FIG. 7, and has substantially no effect in the switching plane as seen in FIG. 8. The beams 127 are then propagated to a third cylindrical lens 132 with optical power in the dispersion plane which focuses each individual wavelength channel beam 127 onto an independent zone 109 of the OPMC 108. Lens 132 has substantially no effect on the beams in the switching plane.

The image of each of the spatially separated beams is a highly asymmetrical ellipse with its major axis in the switching plane. The OPMC device 108 is divided into a series of elongated zones 109 substantially matching the elongated spatially separated wavelength bands. The zones each can include a plurality of independently drivable cells or pixels 135 and wherein, in use, the pixels are preferably driven so as to provide a selective driving structure which projects a corresponding optical signal falling on the zone substantially into one of a series of output order modes. In the illustrated example of FIG. 8, the output order mode in this case coincides with optical port 121.

One method of visualizing the coupling of a particular wavelength channel 127 to a desired output port is that the driving pixels 135 on the OPMC 108 corresponding to the wavelength channel form an optical phase matrix. This matrix is set up in such a fashion so as to recreate the phase of the required output port from the phase front of the input port which will now be described.

The OPMC device 108 in the preferred implementations is a liquid crystal on silicon (LCOS) device. Liquid crystal devices are commonly used for optical modulators. They have a number of advantages over mechanical modulators such as large modulation depths, no moving parts, low power dissipation, potential for large aperture operation and low cost. The LCOS device is a reflective device where a liquid crystal is sandwiched between a transparent glass layer with a transparent electrode and a silicon substrate divided into a 2-dimensional array of individually addressed electrodes. LCOS technology enables very high resolution devices with pixel pitch on the order of 10-20 µm, with each pixel being individually addressed by electrodes on the silicon substrate. The liquid crystals commonly used are dependent on the particular application, where ferroelectric liquid crystals (FLC) are preferred for devices requiring very fast switching times and phase modulations of less than $\pi/2$, and Nematic Liquid Crystals (NLC) are preferred for applications requiring pure phase modulations of up to $2\pi$ in reflection on a pixel-by-pixel basis. The LCOS systems in the preferred embodiments use NLCs. Such devices are available from Boulder Nonlinear Systems of Lafayette, Colo., USA.

The diffractive optical phased matrix can be thought of in terms of a diffraction-grating formed by a quantized multiple level phase grating. The phase grating is constructed by setting the amount of phase retardation on a pixel-by-pixel basis across the face of the beam to be routed. High efficiency of coupling and high isolation of switching states can be achieved through the use of a large number of elements in the phased matrix particularly in the axis of the switching plane as is provided by the large size of the optical projection in that axis As described above, the image on the OPMC is that of a series of spatially separated wavelength channels, arrayed in the wavelength dispersion axis of the system. The wavelength channels are separated spatially in the dispersion plane and the image of each wavelength channel appears substantially as being highly asymmetric with orthogonal dimensions of approximately 25 µm in the focused dispersion plane and approximately 700 µm in the collimated switching plane. Due to the individually addressable nature of the LCOS pixels, the individual wavelength channels can be accessed by the OPMC 108 independently of any of the other channels.

In the following description for simplicity, the beams are assumed to be collimated in the switching plane with a linear phase front though the required functions can be easily calculated for converging or diverging or distorted phase fronts wherein the OPMC will provide optical power attenuation and routing simultaneously.

Figure 9:
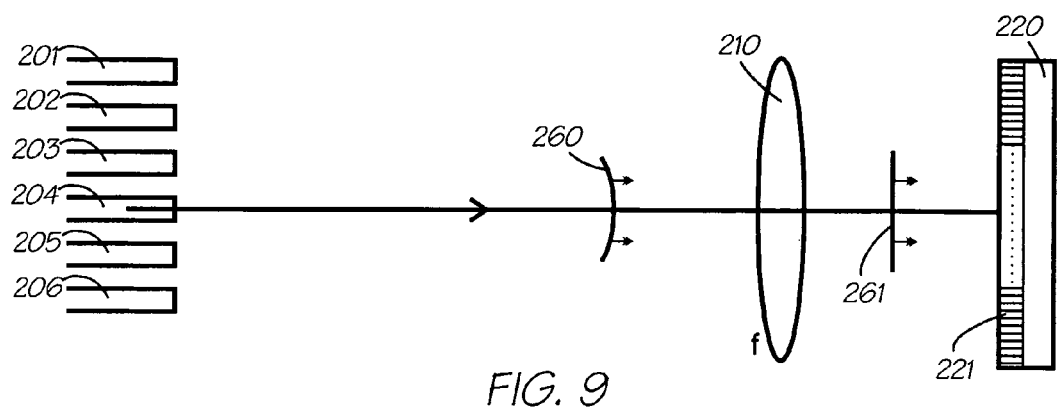
FIG. 9 is a schematic view of a forward propagating beam in the switching plane of an embodiment of the OXC device.
Figure 10:
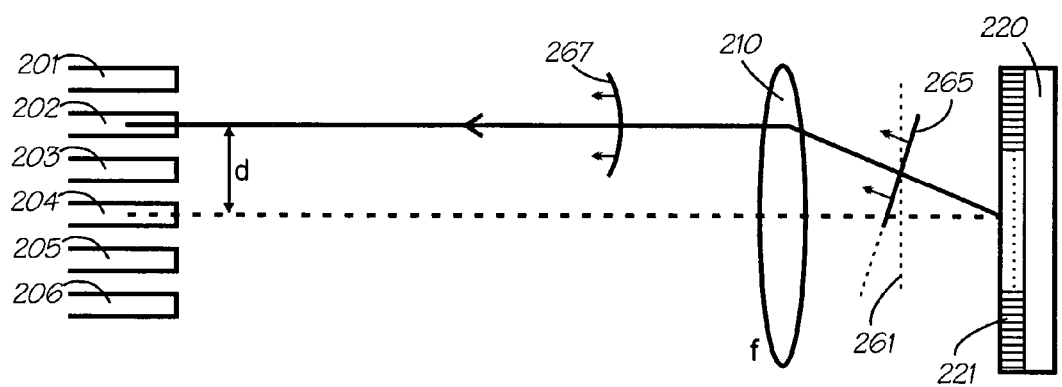
FIG. 10 is a schematic view of a backward propagating beam of an embodiment of the OXC device showing the operation of the OPMC to impart a phase slope onto an incoming beam resulting in a displacement in the switching plane.

Referring to FIG. 9 and FIG. 10, the forward propagating beam from an optical fiber input port 204 is generated with a phase front 260 orthogonal to the direction of propagation. It passes through a lens 210 with a focal length f. The beam is still traveling in the same direction so the phase-front 261 strikes the OPMC device 220 in the plane of the device. To couple this beam into an optical fiber output port 202, the phase-front of the beam after reflection from the OPMC needs to have a phase front 265 which is tilted with respect to the incoming phase-front 261. The amount of tilt is determined by a phase slope $\sigma$ on the OPMC device in units of radians per micrometer. Thus, after passing again through the lens 210, the backward propagating beam with wavefront 267 has been displaced by a distance d with respect to the forward propagating beam, and so is incident on the output port 202. The phase slope $\sigma$ that is needed on the backward propagating phase-front 261 to align with a particular output port is found by $$\sigma = \tan^{-1}\left(\frac{d}{f}\right).$$

This phase slope then needs to be converted into a phase shift on the individual pixels of the LCOS device in the form of a voltage ramp in the plane of the elongated image of the wavelength channel on the OPMC device. The phase shift ρ that each pixel needs to impart on the beam is calculated by $$\rho = \frac{2 \cdot \pi \cdot X \cdot Y \cdot \sigma}{\lambda}$$

where X is the pixel width in μm, Y is the number of pixels in the long axis of the pixel group, and λ is the center wavelength of the channel in μm. The relationship between the phase shift imparted on the beam by each pixel and the voltage applied to that pixel can be determined using a lookup table. This results in an increasing function of voltage (or phase change) with respect to the pixel number as seen by example in the dotted lines 270 and 280 of FIGS. 11 and 12 respectively and using 256 pixels. To limit the amount of voltage applied to the pixel, modulo 2π phase profiles are used so that, each time the phase shift of a particular pixel reaches 2π, the voltage of the next pixel is reset to give a phase shift of zero and the ramp repeated. This is seen by the solid lines 271 and 281 in FIGS. 11 and 12 respectively.

To couple the incident beam striking the OPMC device to multiple output modes, the phase slope σ needs to be modified. It will be appreciated by those field that a simple diffraction grating of period Λ converts a monochromatic incident beam into a series of several beams based on the diffraction order q=0, ±1, ±2, . . . of the grating and with angular separation θ dependent on the period.

Figure 13:
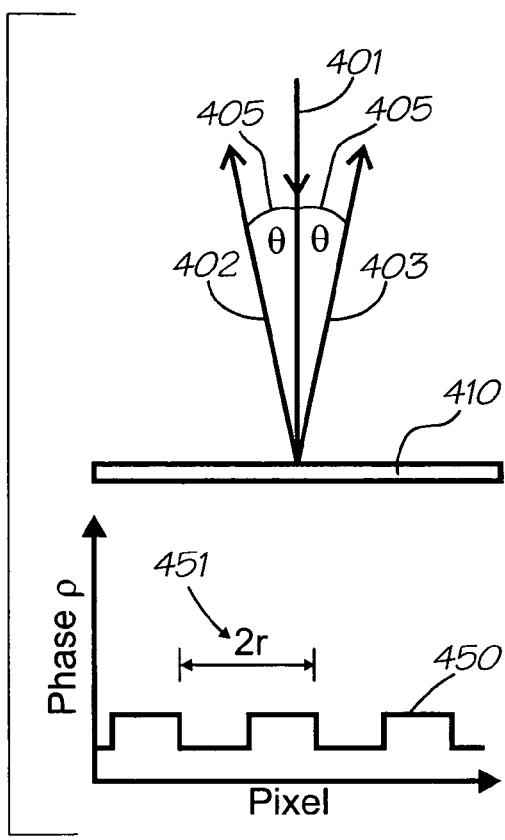
FIG. 13 shows an incoming monochromatic beam and the first order diffracted beams from a phase hologram with period 2r.

FIG. 13 shows an incident monochromatic beam striking an OPMC device 410 which has its pixels set up as a phase grating 450 with period 451 of Λ=2r. The first order (q=±1) reflected beams 402 and 403 are reflected with an angle θ (405) with respect to the zeroth order (q=0) reflected beam which retraces the path of the input beam 401.

Figure 14:
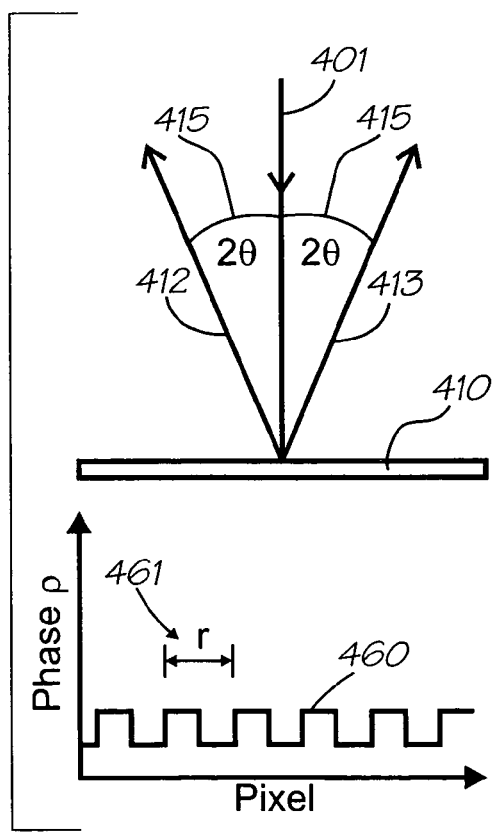
FIG. 14 shows an incoming monochromatic beam and the first order diffracted beams from a phase hologram with period r.

FIG. 14 shows the same monochromatic input beam 401 striking the OPMC device 410 however, the period 461 of the phase grating 460 is halved to Λ=r. The first order reflected beams 412 and 413 are angularly separated from the zeroth order reflected beam by an angle of 2θ (415).

Figure 15:
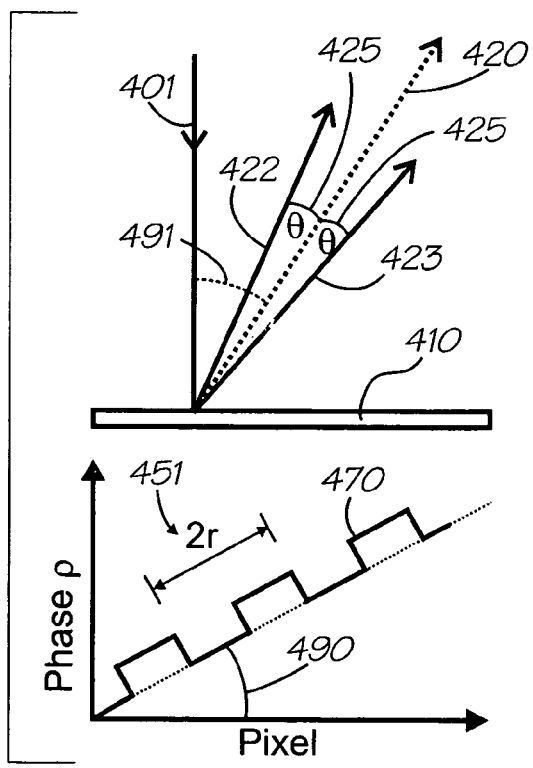
FIG. 15 shows an incoming monochromatic beam and the first order diffracted beams from a phase hologram with phase slope σ and period 2r.

FIG. 15 shows the same monochromatic input beam 401 striking the OPMC device 410. However, this time, the phase profile 470 of the diffraction grating is the sum of the phase profile 450 of FIG. 13 with a phase slope σ (490). This causes the zeroth order reflected beam 420 to be deflected at an angle 491 with respect to the incoming beam 401, and the first order reflected beams 422 and 423 to be deflected with an angle θ (425) on either side of beam 420.

Figure 16:
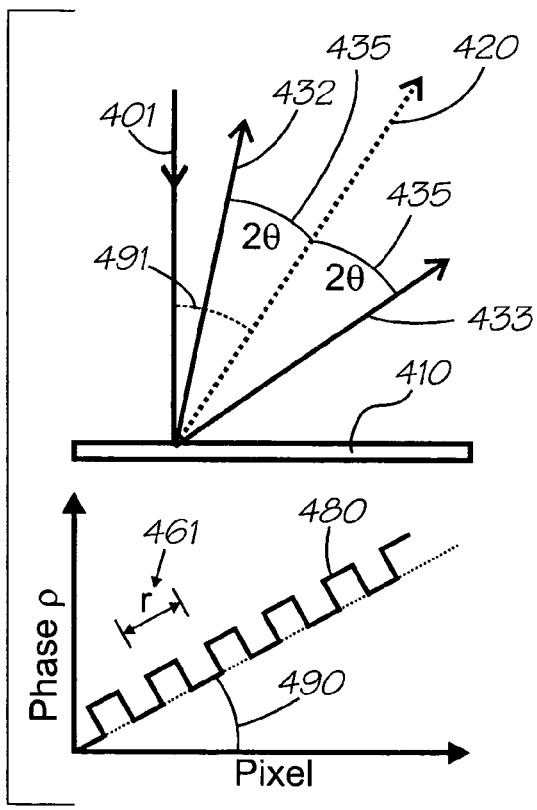
FIG. 16 shows an incoming monochromatic beam and the first order diffracted beams from a phase hologram with phase slope σ and period r.

Similarly, FIG. 16 shows the same monochromatic input beam 401 striking the OPMC device 410 where the phase profile 480 of the diffraction grating is the sum of the phase profile 460 of FIG. 14 with the same phase slope σ (490). This again causes the zeroth order reflected beam 420 to be deflected at an angle 491 with respect to the incoming beam 401 however, the first order reflected beams 432 and 433 are deflected with an angle 2θ (435) on either side of beam 420.

It will be appreciated that by using the above method, a 1×2 OXC can be constructed by taking the signal beam from an input port and co-locating two output ports at the focal points of the two first-order reflected beams. This can be expanded to greater numbers of outputs by suitable control of the diffraction grating period on the OPMC and co-location of output ports with the reflected beams from higher order modes to construct a 1×N OXC.

The OXC device 100 of FIGS. 7 and 8 can be expanded to construct wavelength selective OXC devices with an increased number of input ports which form the building blocks of complex optical networking and routing systems. The operation of an embodiment of the OXC will be described hereinafter in detail with respect to a 2×2 reconfigurable wavelength selective OXC, however this embodiment can also be easily adapted for use as a 1×N OXC.

Figure 17:
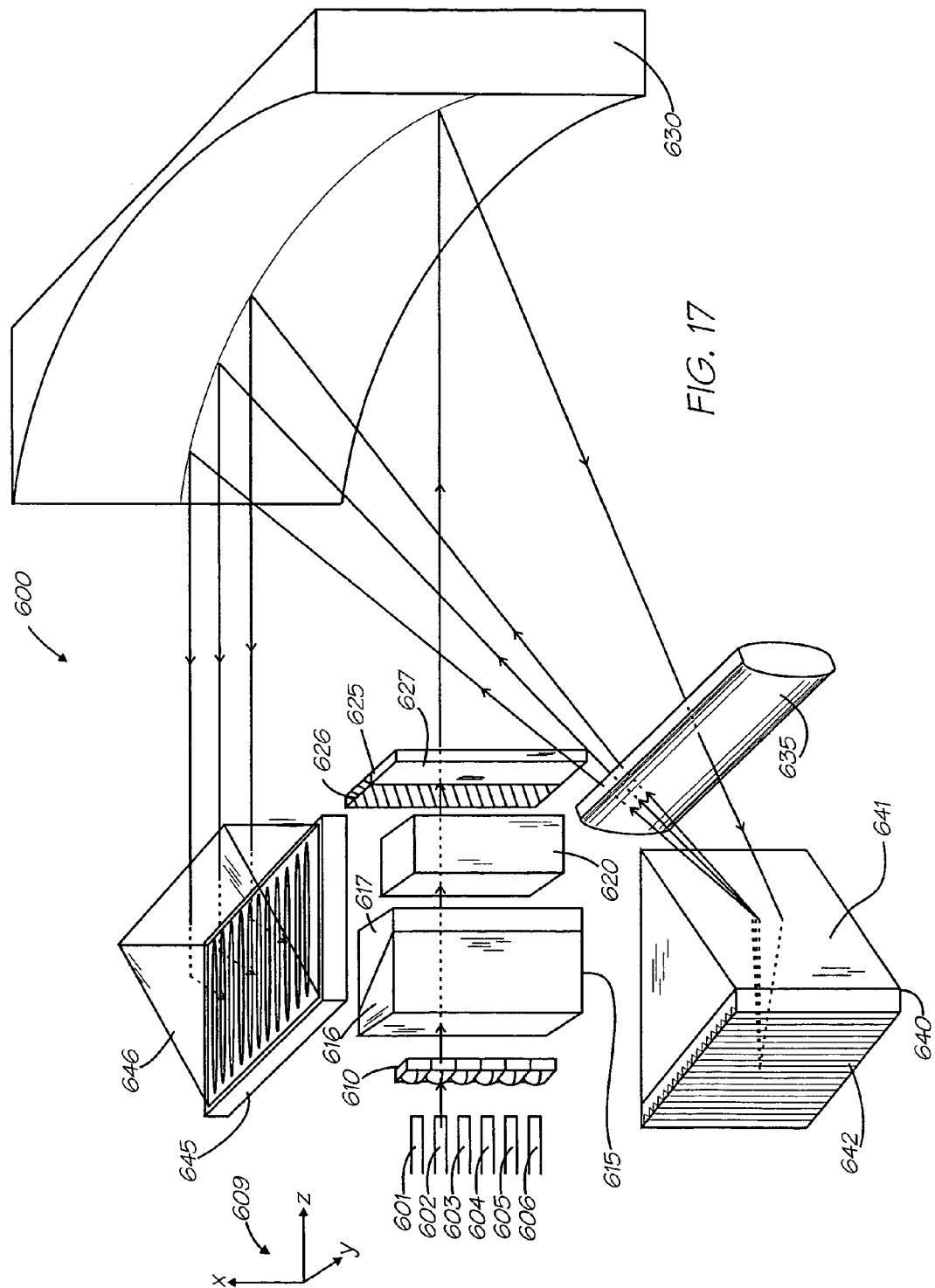
FIG. 17 is an isometric view of a reconfigurable wavelength selective 2×2 OXC in accordance with an embodiment of the OXC device, showing the beam path in the forward propagation direction from an input port to the OPMC device.

Referring to FIG. 17, an arrangement is provided for each wavelength of light to be dispersed and focused in one axis and collimated in the orthogonal axis such that a mode selecting OPMC device can be utilized to select between the various orders of the reflective or transmissive diffraction grating as established by the OPMC operating on one polarization state of light.

In FIG. 17, there is illustrated schematically a side schematic view of the arrangement of the preferred embodiment 600. An array in the switching plane of optical fiber ports 601-606 is initially provided with the initial inputs being along fiber ports 601 and 602. Fiber ports 603 and 606 are designated as first and second output ports respectively and fiber ports 604 and 605 are designated as null (Ø) ports where light incident on these ports is lost to the device. These ports could alternatively be used for monitoring purposes. Each of the fibers can have thermally expanded core ends. The emitted light from the input ports is initially unpolarized.

The path of light in the device will be described with reference to a beam originating from input fiber port 602; however it will be appreciated that a beam originating from input fiber port 601 will be substantially identical.

Light 650 from the input port 602 is first incident on a microlens array of spherical lenses 610 in the x-direction of 3-axis 609. The individual lenses of the array are spaced with a separation corresponding to the fiber array separation. The focal length of the lens is chosen to be about 500 μm positioned at a distance from the fiber array to form a beam waist of approximately 50 μm diameter. The effect of microlens array 610 is to decrease the numerical aperture (NA) of the fibers say from their single mode value of 0.1 to ~0.02. This relaxes the requirements on the optical quality of the subsequent optical elements.

The beam emerging from microlens array is split in the y-direction into two polarization states designated as v in the x-axis (switching plane) and h in the y-axis (dispersion plane) by a composite birefringent wedge known as a Wollaston prism 615. The Wollaston prism is constructed using two right triangle prisms 616 and 617 with perpendicular optic axes. This causes the o- and e-polarization components of the incident unpolarized light to emerge with an angular separation determined by the wedge angle of the prisms. Since the axis of the angular separation (in the y-axis) is orthogonal to the axis of the optical fiber port array (the x-axis), higher extinction ratios are achieved when compared with the alternative of separating the polarizations in the x-axis since the beams are maintained at the separation of the optical ports.

The two orthogonally polarized and diverging beams of the input signal then pass through a simple birefringent crystal 620 such as YVO$_4$. The optic axis of 620 is orientated so that the two polarization s experience different optical path lengths through the crystal. This element allows for a first method of compensating the path lengths between the two polarized beams in the device.

The beams then enter a polarization equalizing optical element 625. This is a plate of λ/2 thickness at 1.5 μm (92 μm) constructed from two bonded elements. The first element is a piece of crystal quartz 626 which acts as a λ/2 waveplate and consequently rotates the polarization axis of light passing through it by 90° (eg between the x- and y-directions). To achieve this, the optical axis of the quartz 626 is rotated 45° with respect to the polarization state of the light. The second element 627 is glass which does not affect the polarization state of the beam passing through it. The two beams, after traversing the polarization equalizing element 625, are now in the same polarization state for efficient operation of the wavelength dispersion elements and the OPMC device.

The beams are next projected to a first y-cylindrical mirror 630 with a focal length of f which provides collimation in the y axis, and are subsequently incident on a cylindrical lens 635 aligned in the x-axis (i.e. having optical power in the switching plane) with a focal length of 4 f. Cylindrical mirror 630 can include a conic term in the definition of its curvature (to produce an acylindrical mirror) thus providing for a second method for equalization of the path lengths of the two beams from each input fiber. After passing through element 635, the beams are partially collimated in the switching plane.

The beams are next incident on a wavelength dispersive element such as a wedged grating prism combination 640, known commonly as a Carpenter's prism or grism, operating in the reflective orientation and aligned at near-Littrow condition. The grism is a combination of two common optical elements which are bonded together, namely a wedged prism 641 and a diffraction grating 642, which can be of either the transmission or reflection type. In the embodiments described here, element 642 is a reflection grating and the beams traverse a double pass through the prism 641, however it would be possible for a person skilled in the art to implement the current system utilizing a grism element with the grating operating in transmission mode. In other embodiments of the system, the wavelength dispersive element can be a simple grating operating in the near-Littrow reflective state for the 1.5 μm light (1200 lines/mm) emerging from the input fiber ports, however the addition of the wedged prism bonded to the grating adds significant advantages to the efficiency of the system, being:

further equalization of the optical path lengths in the dispersion plane;

correction of conical diffraction from the grating by suitable selection of the refractive index and input face angles of the prism to control the grating dispersion characteristics (in particular the angular dependence in the switching plane). Conical diffraction results from non-orthogonal components of the beams striking the grating which ultimately results in errors in the focused position at the fiber ports on the return paths of the beams. The prism has opposite angular dependence to that of the grating thus minimizing the effect;

modification of the effective wavelengths of the beams as they strike the grating to enable the use of higher resolution gratings for more efficient dispersion; that is, a 1.5 μm beam in air requires the use of gratings with ~1200 lines/mm whereas in the prism with refractive index ~1.5, the effective wavelength is ~1 μm and thus gratings with 1700 lines/mm can be used.

In the preferred embodiment, the angle of the prism is such that the light beams (which are in the p-polarization state with respect to the prism) are incident on the prism surface substantially at the Brewster angle to avoid loss of the light due to reflection from the prism interface which is then lost to the system. The light which has traveled through the prism strikes the grating in the s-polarization state (with respect to the grating). In the preferred embodiments, the characteristics of the prism 641 are designed to substantially compensate for the chirp of the grating 642, which in turn substantially eliminates errors due to conical diffraction in the image of the light beams at the output fiber ports.

The now wavelength-dispersed beams then pass back through the prism element 641 of the grism 640 and again are passed through the x-cylindrical lens 635. After the second pass of 635 the now diffracted beams are collimated in the switching plane—the combined effect of the double pass of lens 635 is that of a lens with focal length of approximately 2 f; that is, twice the focal length of the cylindrical mirror 630. This condition ensures that the optical phased-matrix coupling device acts in the telecentric or Fourier plane of the beams in the dispersion plane.

On exiting from the cylindrical lens 635, the now collimated and wavelength dispersed (in the switching plane) beams are incident again on the cylindrical mirror 630 which focuses the beams in the dispersion plane onto the optical phased-matrix coupling (OPMC) means 645 (in the preferred embodiments this is a liquid crystal on silicon spatial light modulator (LCOS SLM)). The beams remain collimated in the switching plane. The mounting of element 645 can be simplified by folding the beams downwards (in the—switching plane) by a prism 646 to allow simple mounting of the OPMC as shown.

The projection on the OPMC comprises a series of spatially separated wavelength channels arrayed in the dispersion plane where the image of each wavelength channel appears substantially as being highly asymmetric with orthogonal dimensions of ~25 μm in the now focused dispersion plane and approximately 700 μm in the collimated switching plane.

Figure 18:
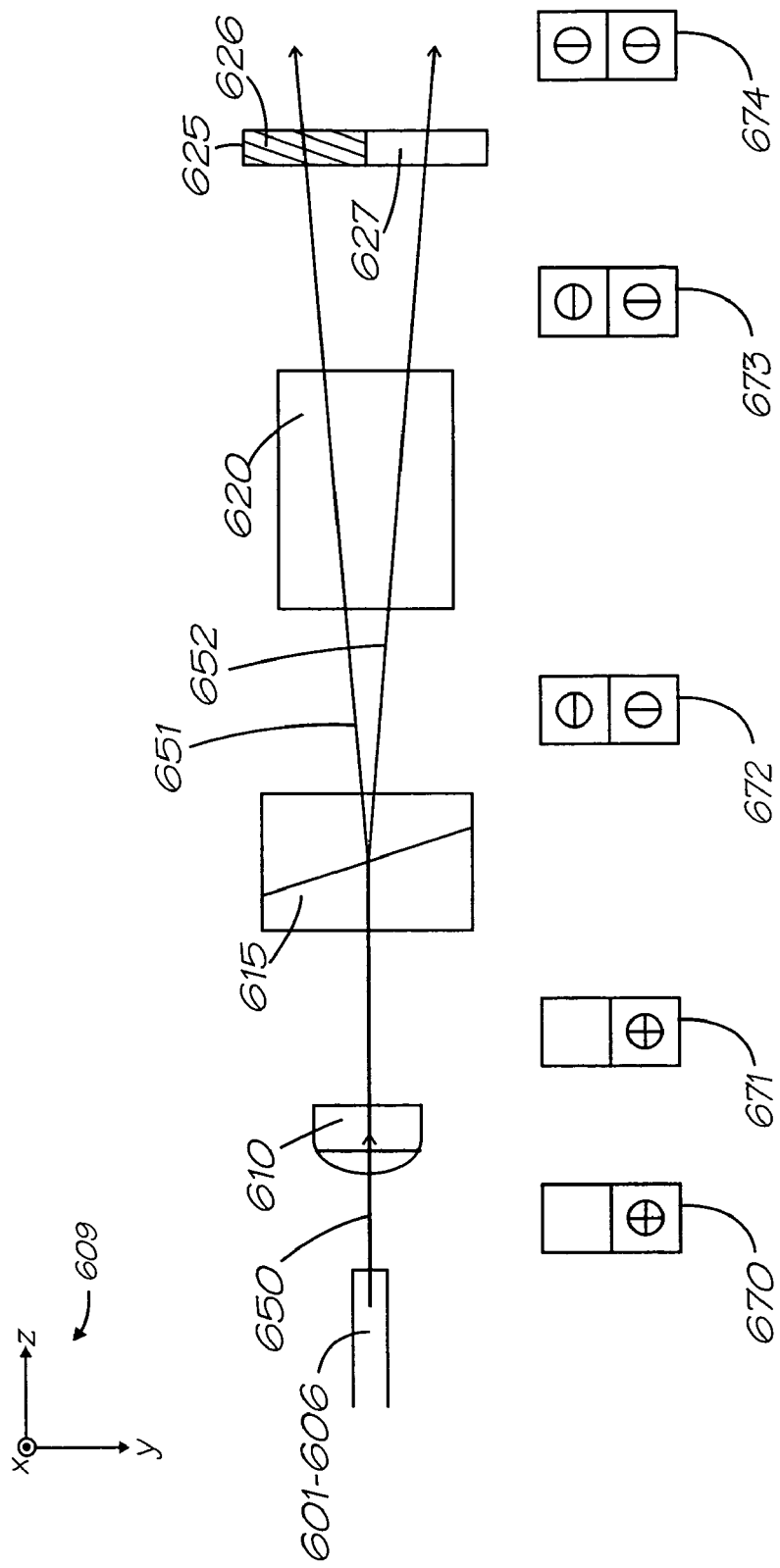
FIG. 18 is a top plan view of the polarization diversity elements of the 3×3 OXC of FIG. 17 and includes polarization state diagrams for beams from the optical ports as they traverse the elements in the forward direction.

For clarity of understanding, FIG. 18 shows a top plan view of the polarization diversity elements at the front end of the OXC device and corresponding polarization state diagrams outlining polarization equalization scheme. In this Figure like components are given corresponding reference numbers. The light beam 650 emerges from the fiber port unpolarized (state 670) and is unchanged after passage through lens 610 (state 671). The Wollaston prism 615 separates the beam into orthogonally polarized beams 651 and 652 (state 672). The path equalization element 620 presents a different optical path for each of the beams but does not alter the polarization state (state 673). The beams then pass through the λ/2 composite polarization equalization element 625 where beam 651 has its polarization rotated by 90° and beam 652 passes through with its polarization unchanged such that both beams are now in substantially the same polarization state (state 674). The polarization of the beams then remains unchanged as they propagate through the remainder of the optical system until they impinge again on element 625 on their return path to the fiber ports.

Figure 19:
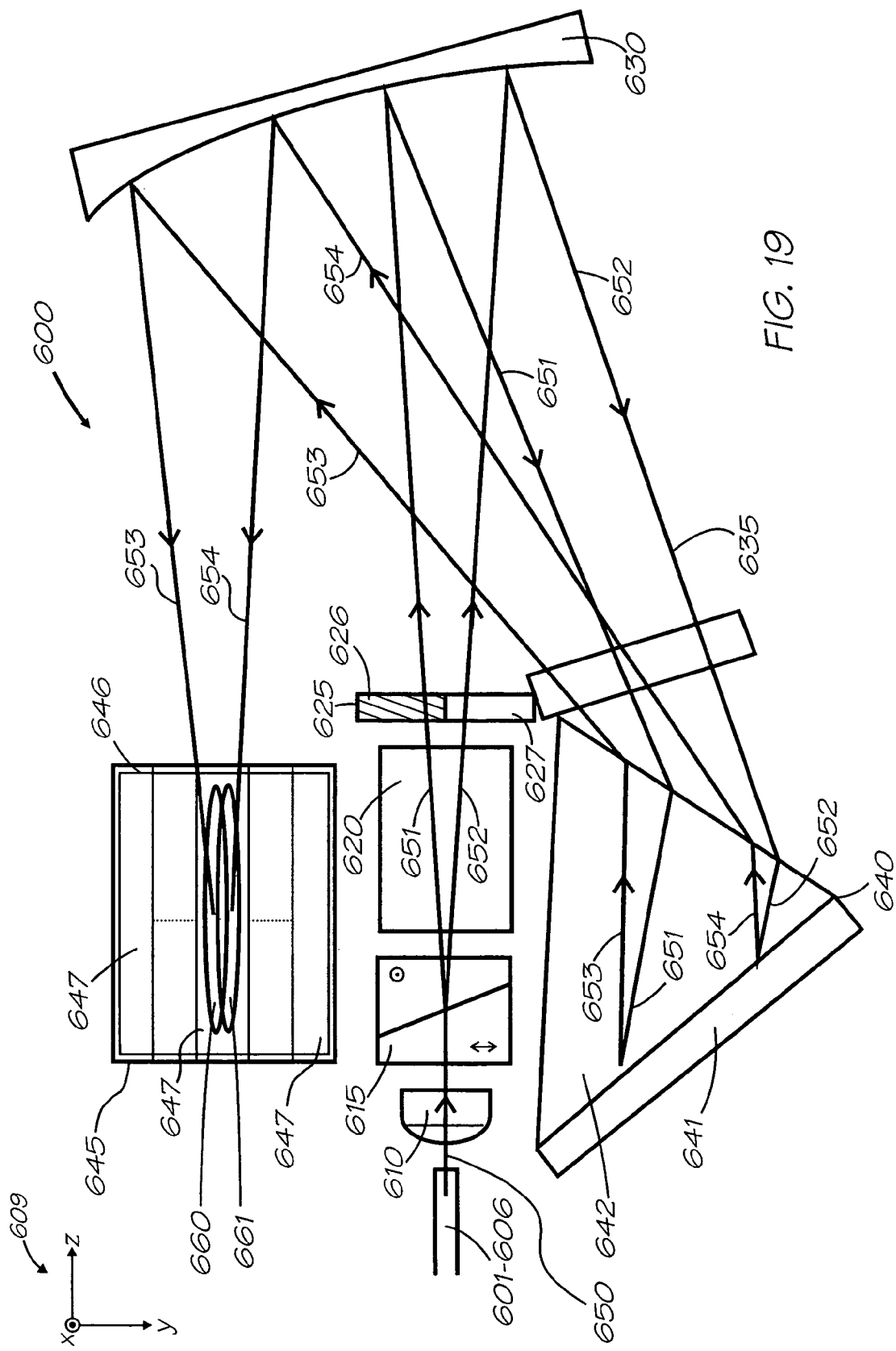
FIG. 19 is a plan schematic view of the reconfigurable wavelength selective 2×2 OXC of FIG. 17, showing the beam path from an input port to the wavelength dispersion element and a plurality of beam paths from the wavelength dispersion element to the OPMC device corresponding to spatially separated wavelength dispersed channels.

FIG. 19 illustrates a top plan view of the arrangement of FIG. 17 where like components are given corresponding reference numbers. Signal beam 650 is emitted by either of the input fiber ports 601 or 602 and is split into two orthogonally polarized beams 651 and 652 by the prism 615. The arrows on the beam paths in this Figure indicate the forward direction of propagation. Beam 651 passes through element 626 which rotates its polarization to be the same as beam 652. Beams 651 and 652 reflect of element 630 and are partially collimated by lens 635 and directed to grism 640, substantially at Brewster's angle. They next strike the grating element 641 at different positions and are each dispersed into a series of angularly multiplexed beams according to wavelength. Beams 653 and 654 are the beams corresponding to the central wavelength channel from the dispersed beams 651 and 652 respectively. They are completely collimated in the switching plane after lens 635 and reflect off mirror 630 to be focused in the dispersion plane onto the OPMC device 645 which is divided into a series of zones 647. The beams are folded downward onto element 645 by prism 646. Each zone 647 corresponds to a selected one of the spatially separated wavelength beams. The individual wavelength channels from the input fiber port can thus be addressed by the OPMC 645 independently of any of the other channels.

Beams 653 and 654 each form an image 660 and 661 respectively on the OPMC device that resembles a highly asymmetrical ellipse. This image is collimated along the major axis and focused at element 645 in the minor axis. If path compensation of beams (651+653) and (652+654) is not performed (for example by $YVO_4$ crystal 620, the conic of mirror 630 and the prism 642), the spot size on the OPMC for each of the wavelength channels is significantly larger in the dispersion plane. This is since the images 660 and 661 of the two polarized beams 653 and 654 do not overlap completely at the focus of mirror 630 on the OPMC, thus creating a larger overall spot size. With optimized path equalization, the images from the two beams can overlap at the OPMC almost completely.

The light reflected from the OPMC then retraces its path back to the fiber array such that beam 653 traverses the path of beam 654 in the backward propagation direction (against the indicator arrows) and vice versa for beam 654. The beams are recombined by elements 625, 620 and 615, and arrive at either on output port 603 or 606, or a null port 604 or 605 depending on the phase shift applied by the OPMC device.

The routing functions that need to be able to be generated of a full-function 2×2 OXC are shown in FIGS. 20-26. In all these figures the optical fiber ports 601 and 602 are the first and second input ports respectively, and the optical fiber ports 603 and 606 are the first and second output ports respectively. The null states Ø can be either of optical fiber ports 604 or 605 (not shown). The notation that will be used to define the state of operation is:

[Input1 Output1:Input2 Output2].

Figure 20:
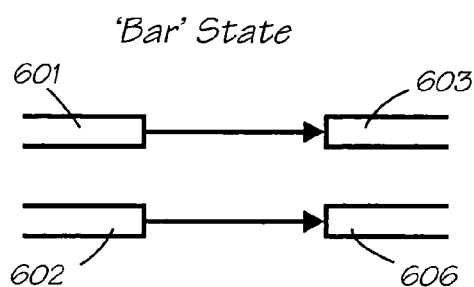
FIGS. 20-26 show the routing functionality states required for a full-function 2×2 OXC device.

FIG. 20 shows the 'Bar State' where light from the first input port 601 is directed to the first output port 603 and light from the second input port 602 is directed to the second output port 606 [601 603:602 606].

Figure 21:
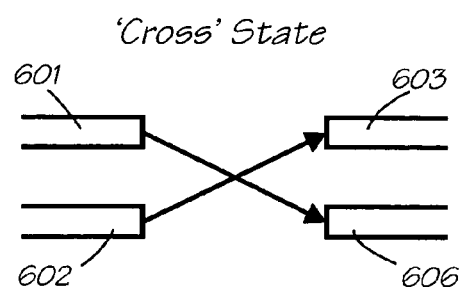

FIG. 21 shows the 'Cross State' where light from the first input port 601 is directed to the second output port 606 and light from the second input port 602 is directed to the first output port 603 [601 606:602 603].

Figure 22:
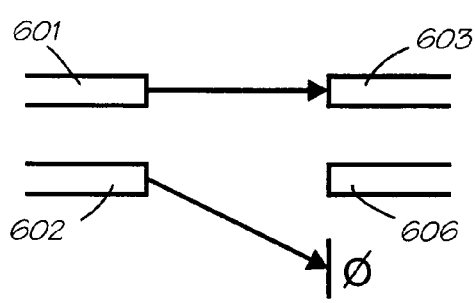

FIG. 22 shows the state where light from the first input port 601 is directed to the first output port 603 and light from the second input port 602 is directed to a null port Ø [601 603:602 Ø].

Figure 23:
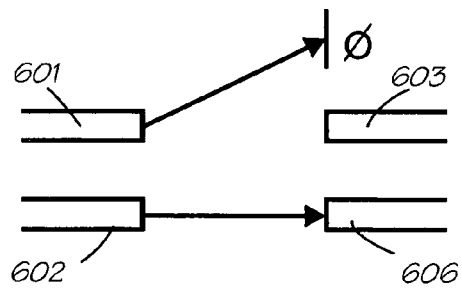

FIG. 23 shows the state where light from the first input port 601 is directed to a null port Ø and light from the second input port 602 is directed to the second output port 606 [601 Ø:602 606].

Figure 24:
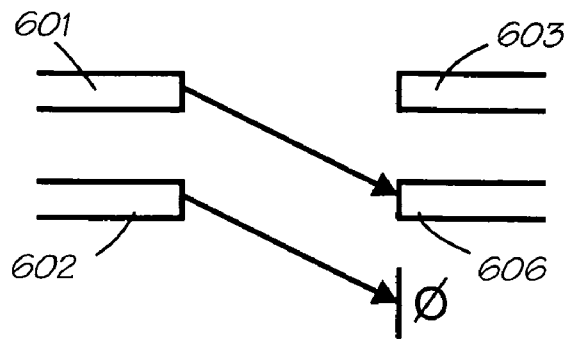

FIG. 24 shows the state where light from the first input port 601 is directed to the second output port 606 and light from the second input port 602 is directed to a null port Ø [601 606:602 Ø].

Figure 25:
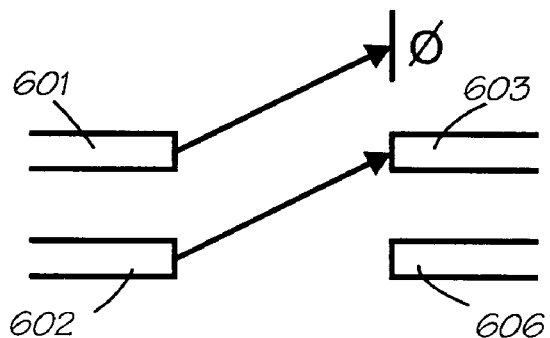

FIG. 25 shows the state where light from the first input port 601 is directed to a null port Ø and light from the second input port 602 is directed to the first output port 603 [601 Ø:602 603].

Figure 26:
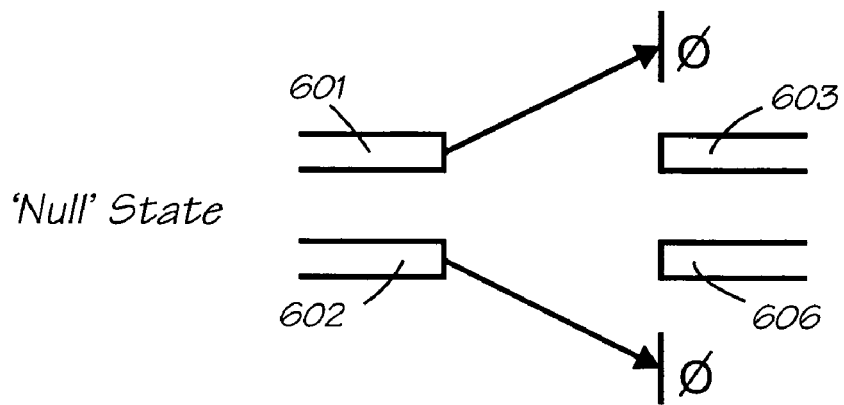

FIG. 26 shows the state where light from both input ports 601 and 602 are directed to null ports Ø [601 Ø:602 Ø].

Figure 11:
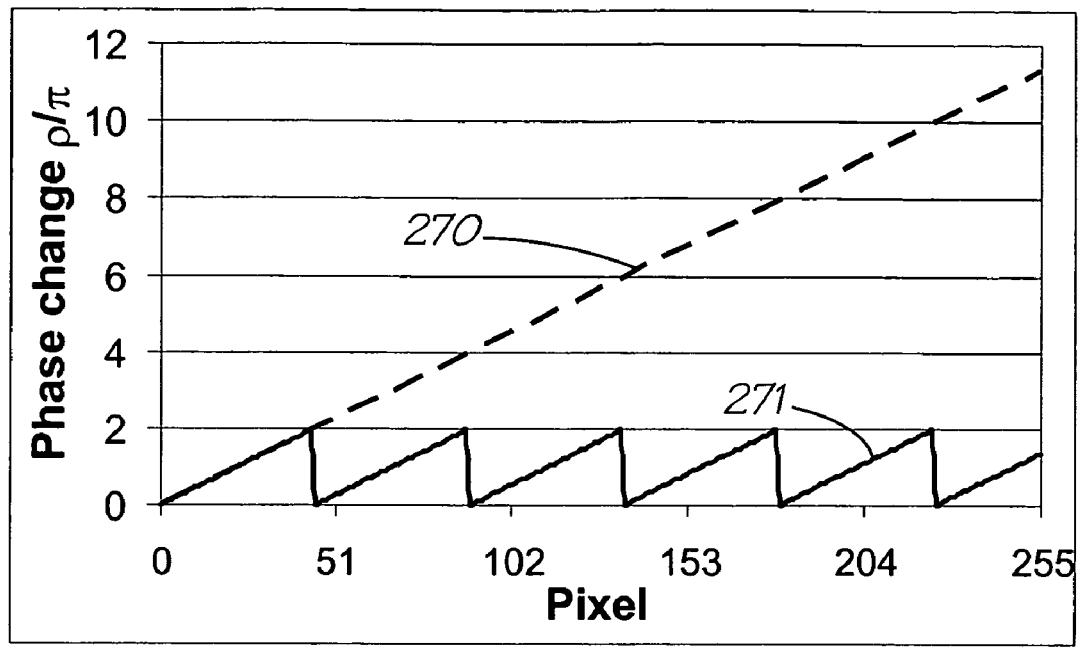
FIG. 11 is a graph showing the phase slope written on to the pixels of the OPMC to switch an incoming beam to a first output port.
Figure 12:
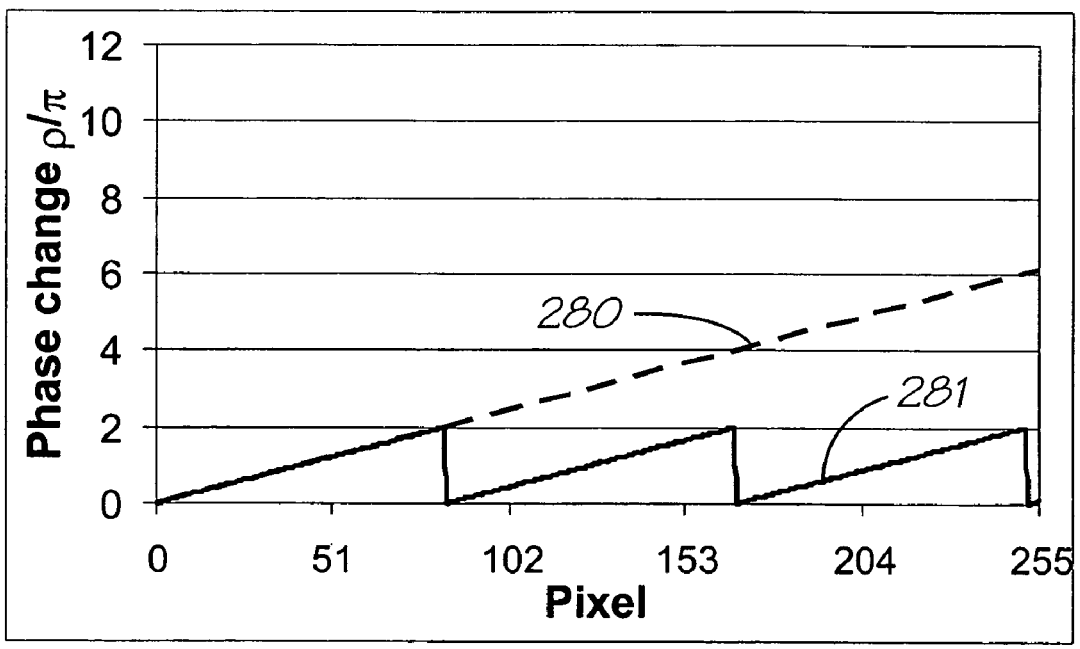
FIG. 12 is a graph showing the phase slope written on to the pixels of the OPMC to switch an incoming beam to a second output port.

In the embodiment of a wavelength selective reconfigurable OXC, each wavelength channel in the optical signal can be arbitrarily set into any one of the above defined functions by a suitable phase slope driving function such as that shown in FIG. 11 or 12 on a zone of the OPMC device 645 at the wavelength of interest.

This type of phase slope can be used to realize the states defined by FIGS. 22-26. The device is initially set up so that all wavelength channels are directed to the null state [Input 1 Ø:Input 2 Ø] by applying a fixed displacement (that is, a phase slope across the LCOS pixels in all zones) across all wavelength channels of, for example $d_0=(4.j+125)$ μm, where j is the separation between the fiber ports. By the reflective symmetry of the embodiment 600 in FIG. 17, this displacement sends all light entering on the first input port 601 to the null-state port 605, and all light entering on the second input port 602 to the null-state port 604. This situation corresponds to the [601 Ø:602 Ø] state of FIG. 26.

To set up the [601 603:602 Ø] state of FIG. 22 for a particular wavelength channel $\lambda_1$, the pixels on the OPMC corresponding to this channel are set with a phase slope corresponding to a displacement of $d_1=(2.j+125)$ μm. This displacement sends the signal at $\lambda_1$ entering the device on input port 601 to the output port 603, and by symmetry, imparts a displacement on the signal at $\lambda_1$ arriving from input port 602 to such that it does not align with any of the fiber ports and is thus lost to the device.

To set up the [601 Ø:602 606] state of FIG. 23 for a particular wavelength channel $\lambda_2$, the pixels on the OPMC corresponding to this channel are set with a phase slope corresponding to a displacement of $d_2=(6.j+125)$ μm. This displacement send the signal at $\lambda_2$ entering the device on input port 602 to the output port 606, and by symmetry, imparts a displacement on the signal at $\lambda_2$ arriving from input port 601 to such that it does not align with any of the fiber ports and is thus lost to the device.

To set up the [601 606:602 Ø] state of FIG. 24 for a particular wavelength channel $\lambda_3$, the pixels on the OPMC corresponding to this channel are set with a phase slope corresponding to a displacement of $d_3=(5.j+125)$ μm. This displacement sends the signal at $\lambda_3$ entering the device on input port 601 to the output port 606, and by symmetry, imparts a displacement on the signal at $\lambda_3$ arriving from input port 602 such that it is output on the null port 605.

To set up the [601 Ø:602 603] state of FIG. 25 for a particular wavelength channel $\lambda_4$, the pixels on the OPMC corresponding to this channel are set with a phase slope corresponding to a displacement of $d_4=(3.j+125)$ μm. This displacement sends the signal at $\lambda_4$ entering the device on input port 602 to the output port 603, and by symmetry, imparts a displacement on the signal at $\lambda_4$ arriving from input port 601 such that it is output on the null port 604.

Figure 27:
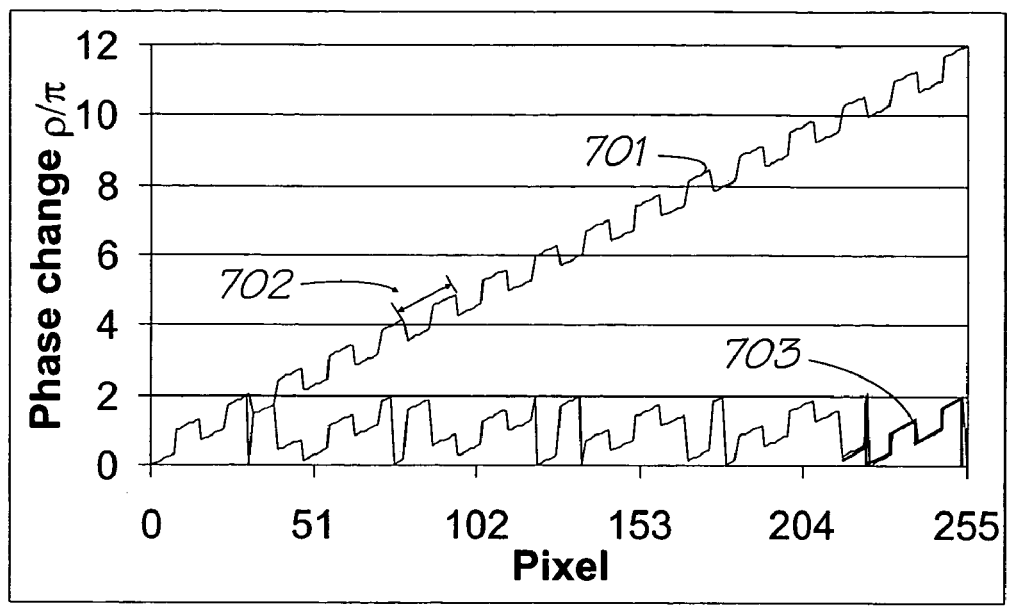
FIG. 27 is graph showing the phase hologram written on to the pixels of the OPMC means to switch incoming beams from Inputs 1 and 2 into the 'Cross' State of the 2×2 OXC.
Figure 28:
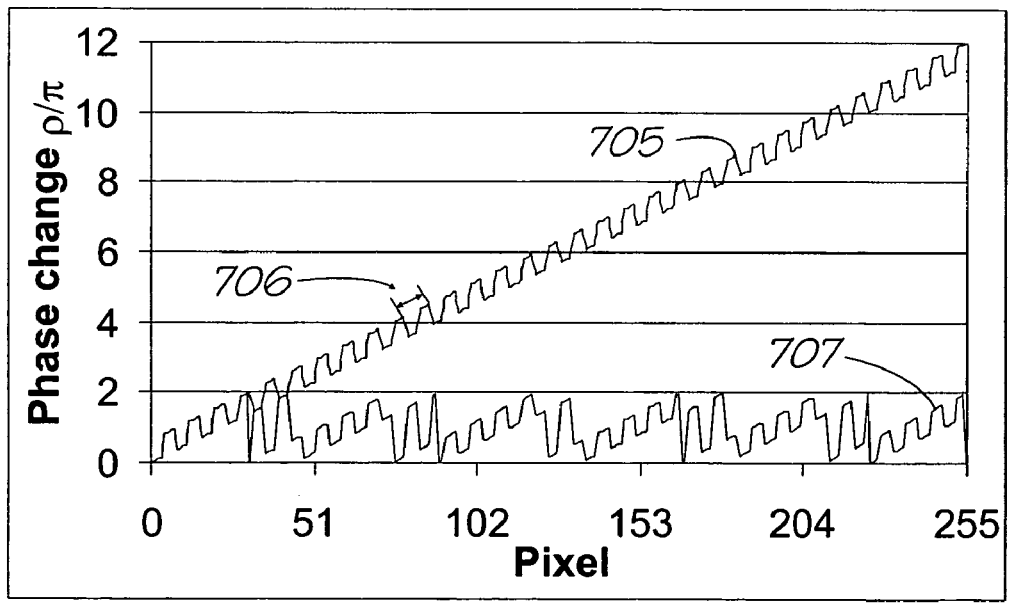
FIG. 28 is graph showing the phase hologram written on to the pixels of the OPMC means to switch incoming beams from Inputs 1 and 2 into the 'Bar' State of the 2×2 OXC.

To set up the 'Bar' and 'Cross' states of FIG. 20 and FIG. 21 respectively, the technique described in FIGS. 13 to 16 is used. FIGS. 27 and 28 show graphs of the two modulo phase patterns (or phase holograms) written onto the pixels of the OPMC means to create the 'Cross' and 'Bar' states of the 2×2 OXC. Modulo phase pattern 701 in FIG. 27 has the same effect on an incoming monochromatic beam of light as depicted in FIG. 15. Modulo phase pattern 701 is formed by the superposition of a phase slope σ and a periodic square-wave function with period Λ=2r (702), and modulo phase pattern 703 is modulo 2π of hologram 701 to minimize the voltage applied to the OPMC pixels. This is the modulo phase pattern that is used to create the situations depicted in FIG. 29 and FIG. 30. Similarly, modulo phase pattern 705 in FIG. 28 has the same effect on an incoming monochromatic beam of light that is depicted in FIG. 16. Hologram 705 is formed by the superposition of the same phase slope σ and a periodic square-wave function with a period of Λ=r (706), and hologram 707 is modulo 2π of hologram 705. This is the modulo phase pattern that is used to create the situations depicted in FIG. 31 and FIG. 32.

FIGS. 29 to 32 all show the first optical input port 601, the second optical input port 602, the first optical output port 603, the optical null ports 604 and 605, the second optical output port 606, the OPMC means 645 and a lens 709 with optical power in the switching plane and placed a distance equal to its focal length away from the OPMC.

Figure 29:
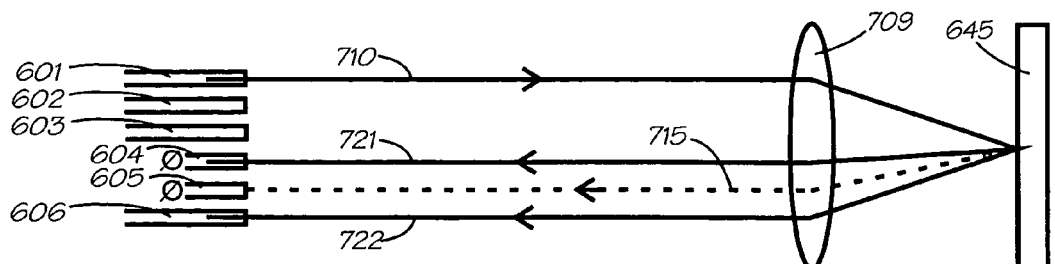
FIG. 29 is a schematic view of an embodiment of the OXC device in the switching plane, showing the forward propagating beam from Input 1 and the backward propagating beams after reflection from an OPMC means with phase hologram 471 of FIG. 21.

In FIG. 29, the forward propagating beam 710 from the first input port 601 is focused onto the OPMC 645 by lens 709. The phase slope of the image 703 (of FIG. 21) on the OPMC directs the zeroth order reflected light 715 onto the null port 605. However, due to the square-wave phase grating with period 702 superimposed onto the phase slope, the light is split symmetrically about the zeroth order beam path 715 such that substantially half of the light falls on the null port 604 (beam 721) and most of the remaining half of the light on the second output port 606 (beam 722).

Figure 30:
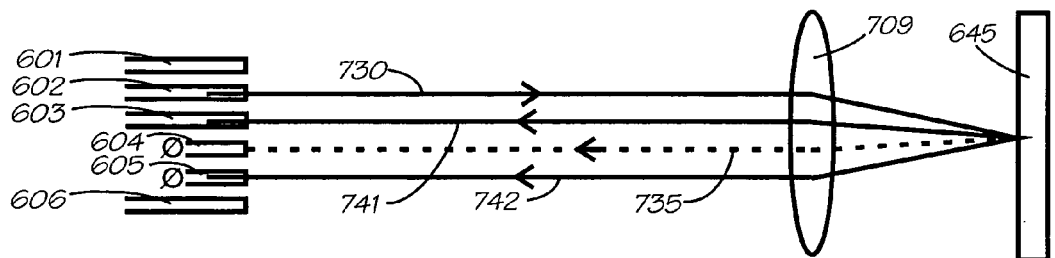
FIG. 30 is a schematic view of an embodiment of the OXC device in the switching plane, showing the forward propagating beam from Input 2 and the backward propagating beams after reflection from an OPMC means with phase hologram 471 of FIG. 21.

FIG. 30 shows the forward (beam 730) and backward propagating beams (741 and 742) for light originating from the second input port 602 when the same phase hologram 703 is formed on the OPMC 645. The zeroth order reflected beam 735 coincides with null port 604, however, the superimposed square-wave phase grating splits the beam equally between null port 605 (beam 741) and the first output port 603 (beam 742). Thus, the phase grating 703 when formed on the OPMC means for a desired wavelength channel creates the 'Cross' state [601 606:602 603].

Figure 31:
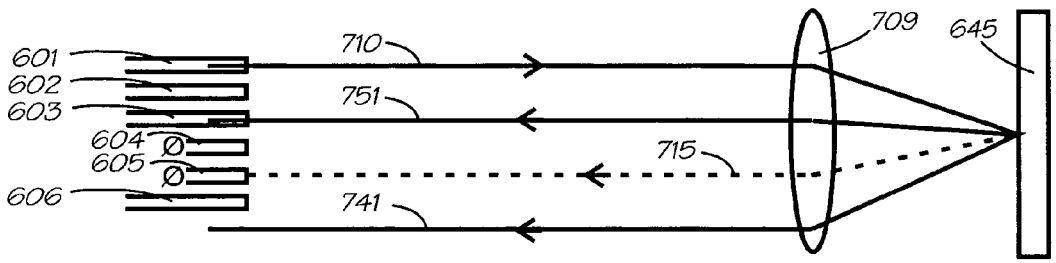
FIG. 31 is a schematic view of an embodiment of the OXC device in the switching plane, showing the forward propagating beam from Input 1 and the backward propagating beams after reflection from an OPMC means with phase hologram 481 of FIG. 22.
Figure 32:
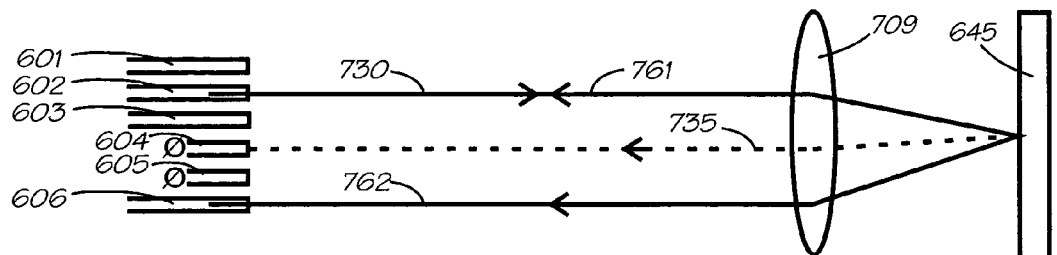
FIG. 32 is a schematic view of an embodiment of the OXC device in the switching plane, showing the forward propagating beam from Input 2 and the backward propagating beams after reflection from an OPMC means with phase hologram 481 of FIG. 22.

The 'Bar' state [601 603:602 606] is set up in a similar fashion as is shown in FIGS. 31 and 32. In both these Figures, the phase grating on the OPMC 645 is that of phase hologram 707 of FIG. 28. The phase slope of the phase hologram is the same as for the 'Cross' state; that is, so that the zeroth order reflected beam paths 715 and 735 for the first and second input ports 601 and 602 coincide with null ports 605 and 604 respectively. The period 706 of the superimposed square wave, however, is halved so that the angular deviation of the first order reflected beams is thus doubled. Thus, for light from the first output port 601 shown in FIG. 31, substantially half of the reflected light is directed to the first output port 603 (beam 751) and most of the remaining half of the light (beam 752) is lost to the device. Similarly for light originating from the second input port (beam 730), the light is split symmetrically about the zeroth order reflected beam path 735 to form beam 762 directed to the second output port 606 and beam 761 retroreflected onto the second input port 602. The retroreflected light on the input port 602 can be easily removed from this port by common methods in the field such as an optical circulator outside the device.

Figure 33:
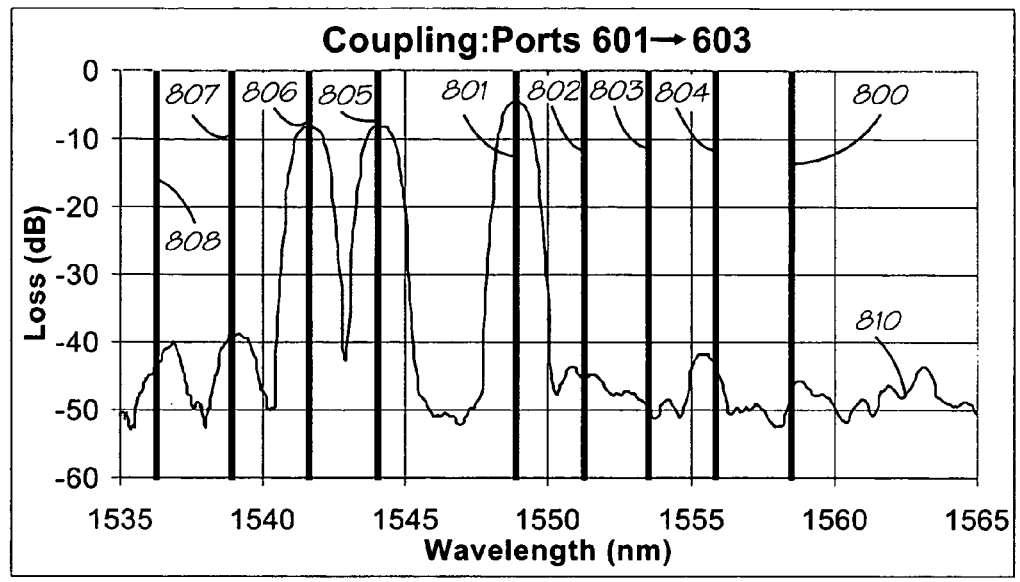
FIG. 33 shows experimental results of the reconfigurable wavelength selective 2×2 OXC for light entering at the first input port and exiting at the first output port.
Figure 34:
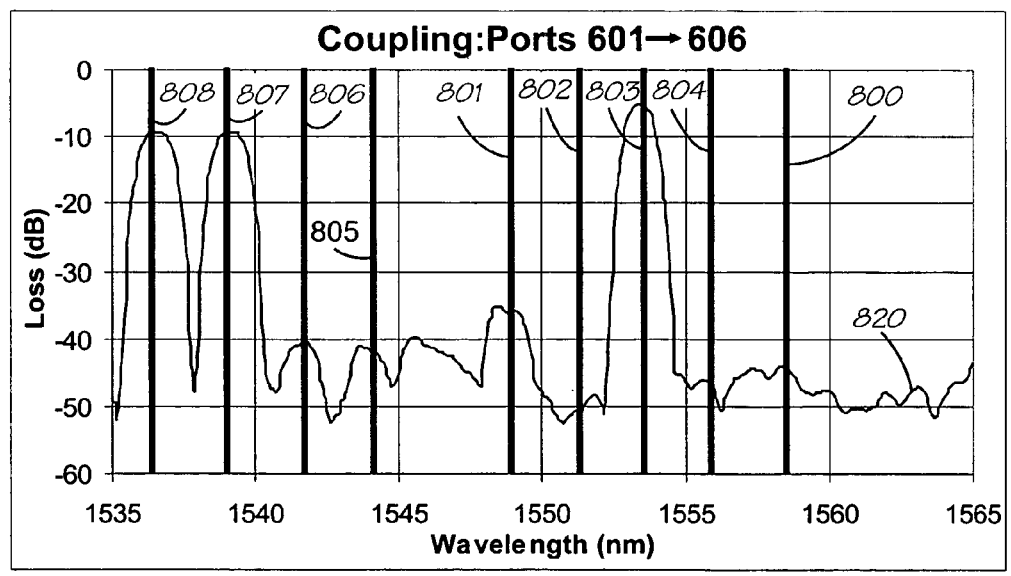
FIG. 34 shows experimental results of the reconfigurable wavelength selective 2×2 OXC for light entering at the first input port and exiting at the first output port.
Figure 35:
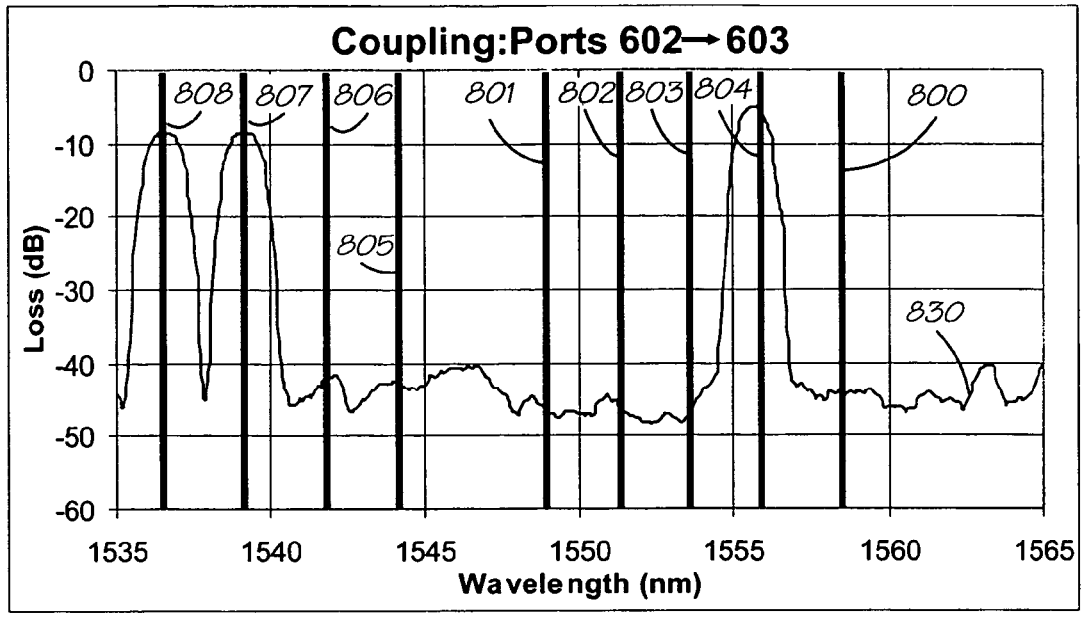
FIG. 35 shows experimental results of the reconfigurable wavelength selective 2×2 OXC for light entering at the first input port and exiting at the first output port.
Figure 36:
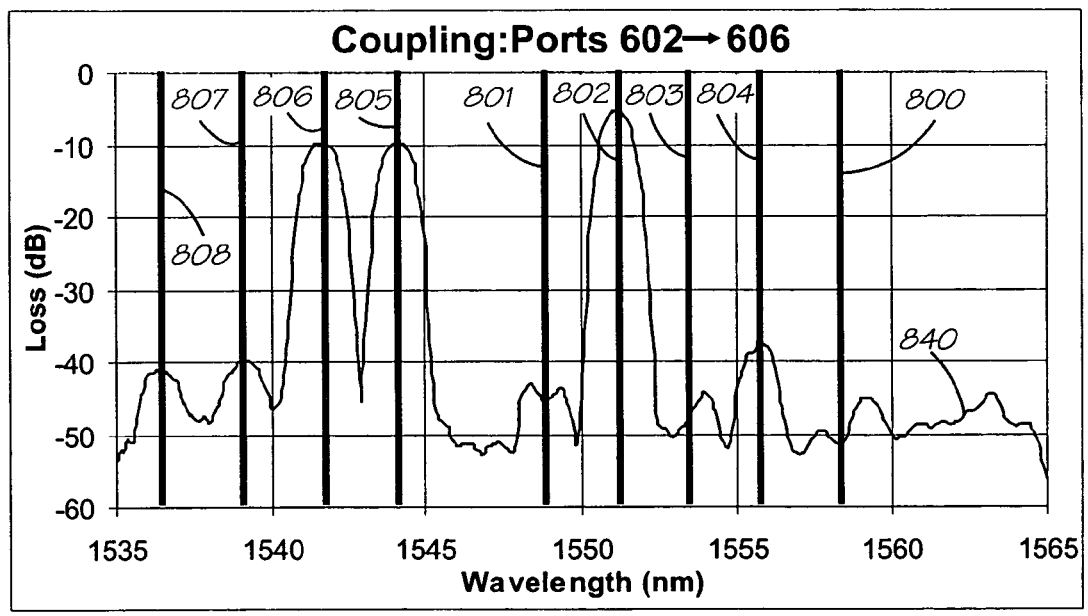
FIG. 36 shows experimental results of the reconfigurable wavelength selective 2×2 OXC for light entering at the first input port and exiting at the first output port.

It can now be appreciated that all the required states for a full-function 2×2 OXC device can be realized using the herein-above described device, namely the 'Bar' state [601 603:602 606], the 'Cross' state [601 606:602 603], [601 603:602 Ø], [601 Ø:602 606], [601 606:602 Ø], [601 Ø:602], and the null [601 Ø:602 Ø]. Also, since the OPMC means operates separately on individual wavelength channels contained in the inputted optical signals, any of the states can be created for any arbitrary channel Example results achieved from a constructed system will now be presented with reference to FIGS. 33 to 36. FIG. 33 shows an example of measured attenuation characteristics 810 of the 2×2 wavelength selective OXC throughput for light originating from the first input port (601 of FIG. 17) and exiting at the first output port (603 of FIG. 17); FIG. 34 shows the attenuation characteristics 820 of the throughput for light originating from the first input port (601 of FIG. 17) and exiting at the second output port (606 of FIG. 17); FIG. 35 shows the attenuation characteristics 830 of the throughput for light originating from the second input port (602 of FIG. 17) and exiting at the first output port (603 of FIG. 17); and FIG. 36 shows the attenuation characteristics 840 of the throughput for light originating from the second input port (601 of FIG. 17) and exiting at the second output port (606 of FIG. 17). Shown also on these figures are wavelength channels with center wavelengths $\lambda_0$ (line 800), $\lambda_1$ (line 801), $\lambda_2$ (line 802), $\lambda_3$ (line 803), $\lambda_4$ (line 804), $\lambda_5$ (line 805), $\lambda_6$ (line 806), $\lambda_7$ (line 807), and $\lambda_8$ (line 808).

$\lambda_0$ (800) is indicative of the null state [601 Ø:602 Ø] since no appreciable signal appears on either of the output ports (603 or 606 of FIG. 17) from either of the input ports (601 or 602 of FIG. 17). This is achieved with a simple phase slope to give a displacement of the reflected signal so that light from the first input port (601 of FIG. 17) is output at null port (605 of FIG. 17), and light from the second input port is output at the null port (604 of FIG. 17) ie the zeroth order reflected beam path of FIGS. 29 and 30 respectively.

The cross connect states of the remaining wavelength channels have been set up in this example are summarized in the table of FIG. 37. Each channel is identified as being present on a particular throughput path 601 603, 601 606, 602 603, or 602 606 as follows:

channel $\lambda_1$ is in state [601 603:602 Ø];
channel $\lambda_2$ is in state [601 Ø:602 606];
channel $\lambda_3$ is in state [601 606:602 Ø];
channel $\lambda_4$ is in state [601 Ø:602 603];
channels $\lambda_5$ and $\lambda_6$ are in the 'Bar' state [601 603:602 606]; and
channels $\lambda_7$ and $\lambda_8$ are in the 'Cross' state [601 606:602 603].

Any wavelength channel can be reconfigured to another state independently of any of the other channels by selectively changing the phase hologram in the control zone 647 of the OPMC device 645 corresponding to that channel. Channel by channel control of optical power can also be achieved by exciting a fraction of the power into a mode that doesn't correspond to an active port hence attenuating the power in the chosen path. This is realized by slightly altering the phase slope, the period of the superimposed square-wave, or both on the particular channel to be attenuated.

It can thus be appreciated that the device as described hereinabove operates as a full-function reconfigurable wavelength selective 2×2 all-optical wavelength selective OXC.

The 2×2 all-optical wavelength selective OXC can be easily adapted to include add/drop functionality for arbitrary wavelength channels simply by including, in the simplest case, two extra fiber ports, one designated as a third input or add port and the second as a third output or drop port. Referring back to the optical layout of FIG. 17, a particular wavelength channel $\lambda_i$ originating from either the first or second input ports 601 or 602 can be directed to the drop port by setting the phase slope of the OPMC for that channel to give the desired displacement at the fiber array to the reflected beam such that it coincides with the drop port. Conversely, a wavelength channel input to the device on the add port can be directed by a suitable choice of phase slope such that the reflected beam is incident on the desired output port 603 or 606.

The 2×2 all-optical wavelength selective OXC as described above can be expanded to a 4×4 (four input ports and four output ports) all-optical reconfigurable wavelength selective OXC. An example of such a system will now be described with reference to the optical system 900 of FIG. 38. This system is substantially equivalent to the 2×2 OXC device 600 of FIG. 17 but includes more optical fiber ports 901-911 and additional polarization manipulation elements (915 and 950). Optical fiber ports 901-904 are the four input ports which in the present example are spaced at 250 µm intervals. Polarization element 915 is a combination of polarization control elements which act to impart an angular deflection on the light originating from input ports 902 and 904 with respect to the light originating from input ports 901 and 903. Polarization element 950 is a composite λ/2 waveplate to substantially equalize the polarization or the deflected beam with that of the undeflected beams. Optical fiber ports 905-911 are alternately designated as optical output and null ports (ie ports 905, 907, 909 and 911 are the four optical output ports) and in this example are spaced at 500 µm intervals. For simplicity, only the light paths 960 and 980 from input ports 901 and 902 respectively are shown. Light from input port 903 is transformed in a substantially equivalent manner to that experienced by light from input port 903 (beam 960), and is projected to the same region of the OPMC device 645. Similarly, the behavior of light from input port 904 is substantially equivalent to that of light from input port 904 (beam 980) and is projected to the same region of the OPMC device 645. Both beams 960 and 980 are initially unpolarized.

Figure 38:
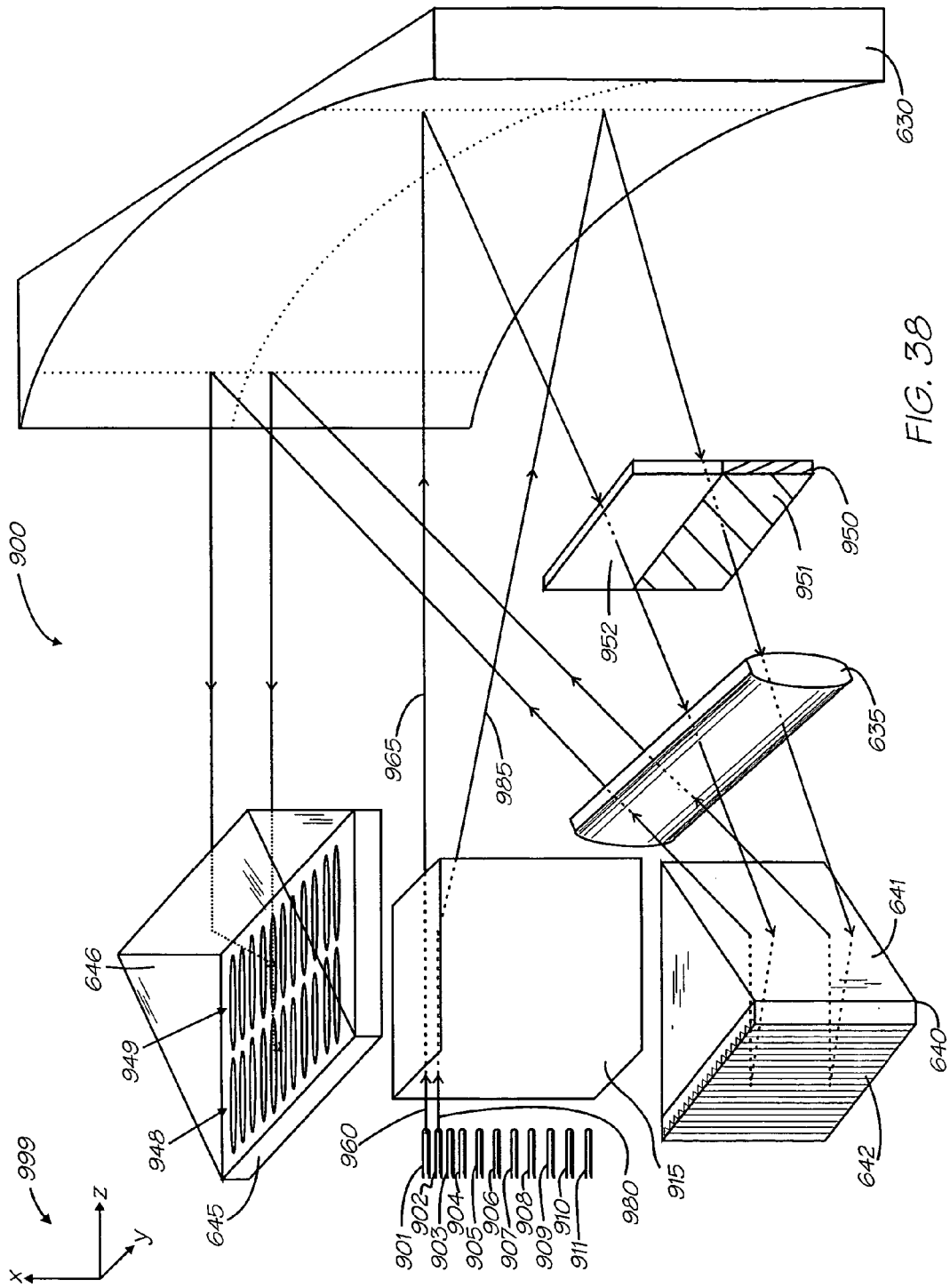
FIG. 38 is an isometric view of a reconfigurable wavelength selective 4×4 OXC in accordance with a further embodiment of the OXC device, showing the beam path in the forward direction from two input ports to the OPMC device.
Figure 39:
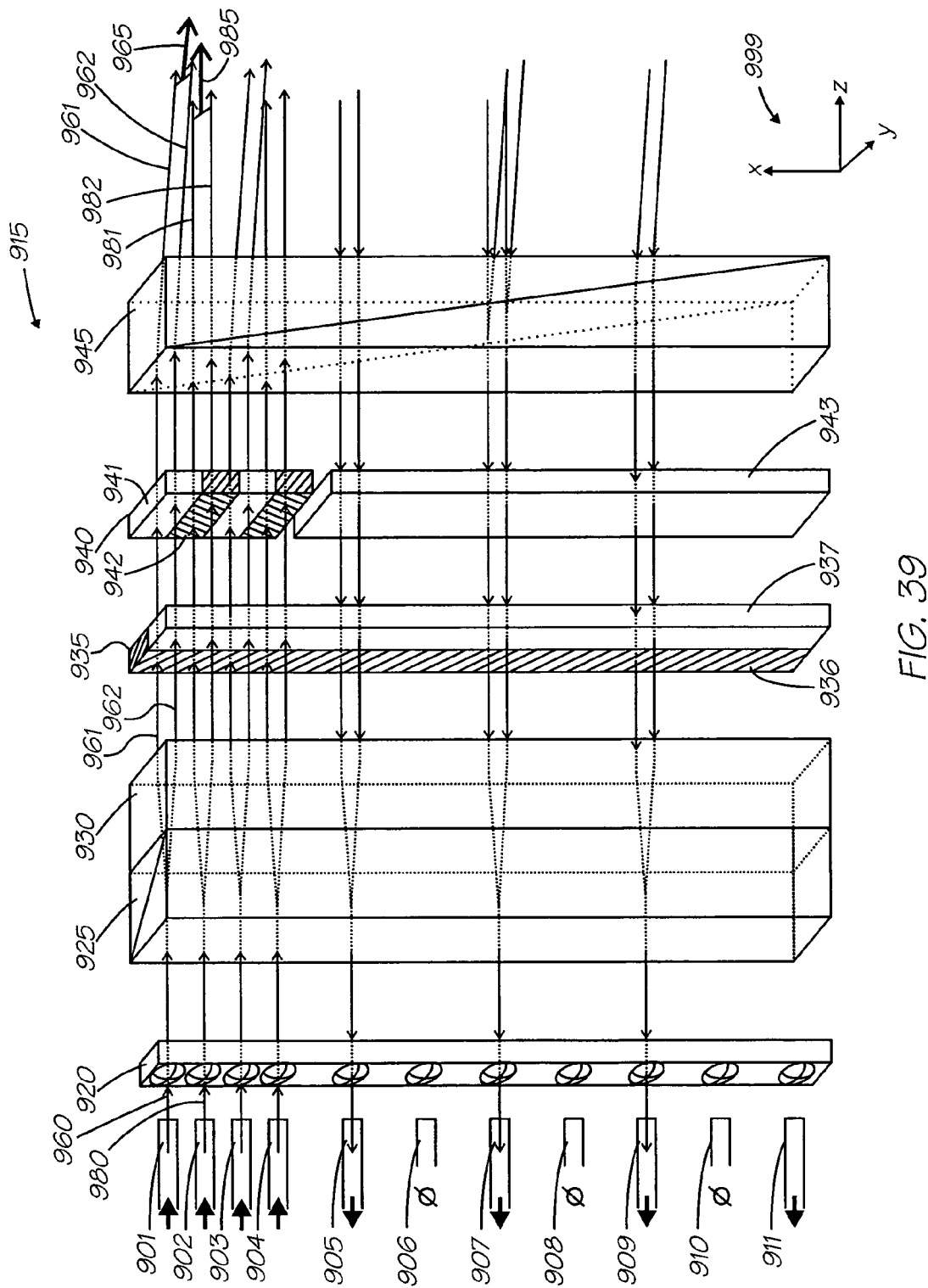
FIG. 39 is an isometric view of the polarization diversity optics of the embodiment shown in FIG. 38.

The structure of the optical element 915 is shown in more detail in FIG. 39. Beam 960 enters the polarization manipulation elements 915 and emerges as beam 965 with its propagation direction substantially unchanged and substantially polarized with a polarization axis in the vertical direction. On the other hand, beam 980 emerges from the polarization manipulation elements 915 as beam 985 substantially polarized with a polarization axis in the horizontal direction. Also, the propagation direction of beam 985 has an angular separation in the vertical axis with respect to the propagation direction of beam 965. Returning to FIG. 38, the beams are projected to a further polarization equalization element 950. Beam 965 passes through a glass region 952 with its polarization substantially unchanged. Beam 985 passes through an optically active region 951 (made from, crystal quartz, rutile or similar material) of element 950 which rotates its polarization axis to be substantially equal to that of beam 965. The beams 965 and 985 then propagate to the grism 640 where they are each dispersed into a series of beam with angular separation with respect to wavelength and projected to the OPMC device 645 where they form two independent arrays 948 and 949 of spatially dispersed (with respect to wavelength) elongate images. The array 948 of images is formed by light originating from input ports 901 and 903, and the array 949 of images is formed by light originating from input ports 902 and 904. Each of the elongate images in the arrays is substantially collimated along its major axis and substantially focused in its minor axis, and is projected onto an independently controllable zone of the OPMC.

FIG. 39 shows a detailed schematic perspective view of the optical ports 901-911 and the polarization control elements 915. The optical ports array includes four optical input fibers 901 to 904, four optical output ports 905, 907, 909 and 911, and optical null ports 906, 908 and 910. By example, the input beam 960 originating from input port 901 will first be traced through the polarization control elements 915. The optical ports are aligned with a spherical microlens array 920 which is used to adjust the numerical aperture of the beams. Beam 960 is split into two beams 961 and 962 with substantially orthogonal polarization states by a Wollaston prism 925. Beams 961 and 962 continue to propagate with an angular separation given by the wedge angle of prism 925.

The two beams pass through a path-length compensating birefringent crystal 930 such as YVO$_4$, and impinge on a composite polarization-equalizing λ/2 waveplate 935. Beam 961 passes through a quartz region 936 of element 935 and has its polarization rotated by 90°, and beam 962 passes through an ordinary glass region 937 which does not alter the polarization state such that both beams are now substantially in the same polarization state.

Both beams 961 and 962 next pass though a common zone (941) of a second composite polarization-rotating λ/2 waveplate 940. This waveplate is constructed with a number of alternating regions 941 and 942 of glass and crystal quartz respectively. Since the beams pass through a glass region of waveplate 940, their polarization is unchanged.

Finally, the beams are incident on a second Wollaston prism 945 its wedge angle in the x-dimension or switching plane which deflects beams with a vertical polarization downwards with respect to the initial propagation direction.

The two beams 961 and 962 then propagate through the remainder of the optical system in a similar fashion to that described with reference to FIG. 19, except that the image formed on the OPMC device 645 is an array 948 (of FIG. 38) of wavelength dispersed elongate images. Each approximately half as large along the major, collimated axis as those shown in FIG. 19, and located as shown in FIG. 38. For simplicity, beams 961 and 962 are collectively referenced by beam 965.

Similarly, a beam 980 from input port 902 is split into two polarized beams 981 and 982 by Wollaston prism 925. The two beams are path-length compensated by element 930 and equalized by element 935 before impinging on a crystal quartz region 942 of the polarization rotation element 940. The polarization of beams 981 and 982 is rotated by substantially 90° into the horizontal polarization such that they pass undeviated through the second Wollaston prism 945. Once again, the two beams are collectively referred to as beam 985 and propagate through the remainder of the optical system to form an array of wavelength dispersed images 949 (of FIG. 38) on the OPMC device 645.

The Wollaston prism 945 effectively tags the projections from alternate optical input ports into two groups of light with an angular multiplex. Turning to FIG. 38, the tagged beams 965 and 985 pass through a further composite λ/2 waveplate 950 (of FIG. 38) which has alternating regions of glass 951 and birefringent quartz 952 which equalizes the polarization states of all the beams to be vertical. This ensures efficient operation of the grism and OPMC device which are both polarization sensitive elements. The light from the first group corresponding to the odd optical ports 901, and 903 forms a first array of wavelength dispersed images 948 on the OPMC device. The light from the second group corresponding to even optical ports 902 and 904 forms a second array of wavelength dispersed images 949.

The OPMC device can independently control the phase profile of each of the images impinging upon it in the manner described previously such that they can be selectively directed to either: any of the output ports 905, 907, 909 or 911; or a combination of multiple output ports by choosing an point intermediate the desired outputs and applying a suitable periodic modulation to split the beams between the outputs as previously described.

Figure 40:
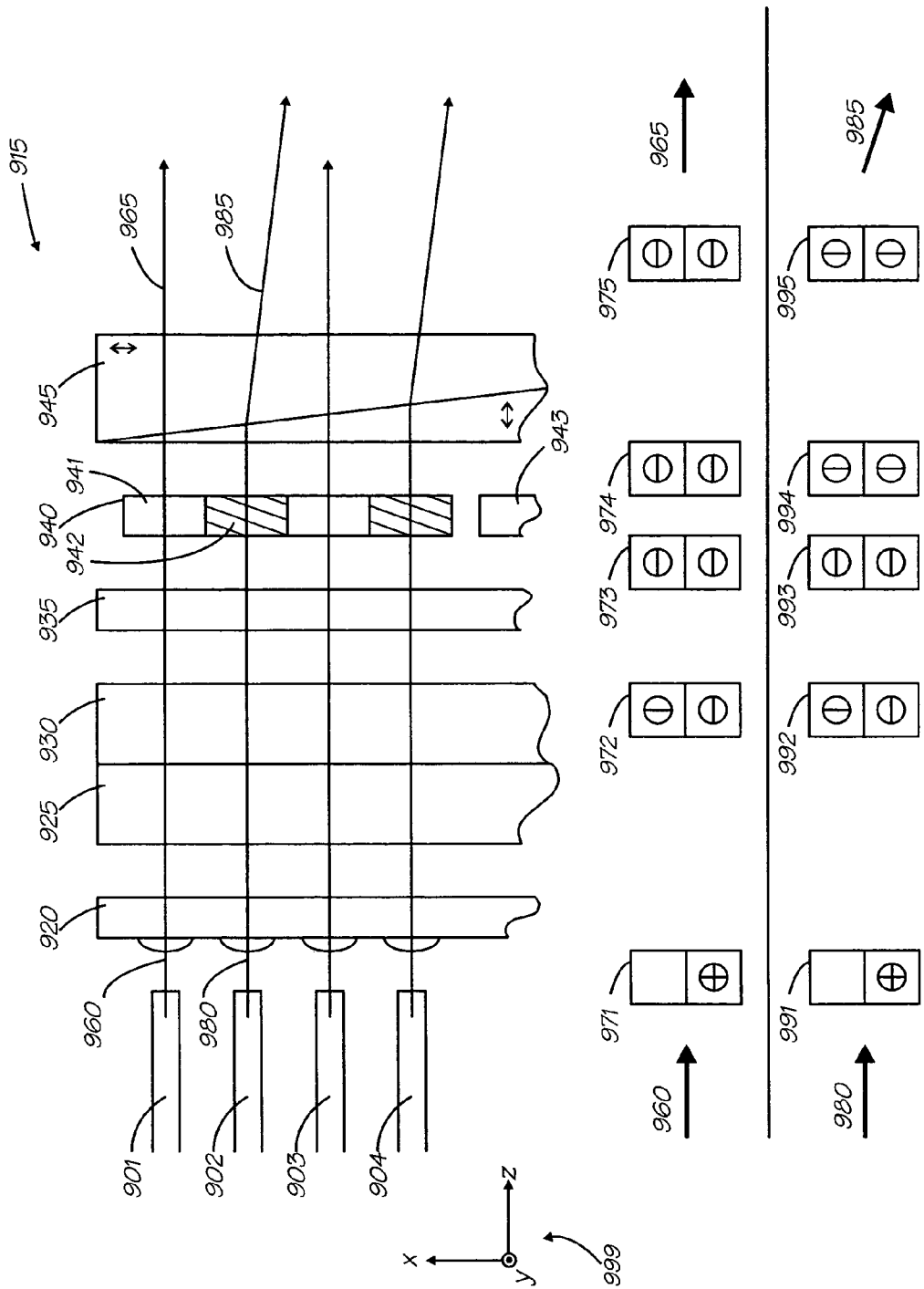
FIG. 40 is a side cut away plan view of the polarization diversity optics of FIG. 39 and the polarization state diagrams for the input beams of the device.

For further clarification, FIG. 40 shows a cutaway side plan view of the polarization elements 915 seen by the light originating from any of the optical input ports 901-904. Polarization state diagrams 971-975 correspond to the polarization of input beam 960 at the point where the state diagram appears.

To more clearly show the difference between the alternate fiber ports, FIG. 41 shows a top plan view of light projected from input port 901 (light from input port 903 is substantially identical) and FIG. 42 shows a top plan view of light projected from input port 904 (light from input port 904 is substantially identical) with the corresponding polarization state diagrams. Like features in FIGS. 40-42 have been given corresponding reference numbers.

In FIG. 41, an input beam 960 from input port 901 has its numerical aperture modified by a corresponding lens element in the microlens array 920. Beam 960 is initially unpolarized as shown by polarization state 971. Beam 960 impinges on the first Wollaston prism 925 which separates the beam in the y-direction into two beams 961 and 962 with substantially orthogonal polarizations 972. Beam 961 strikes a quartz region 936 of polarization diversity element 935 which rotates the polarization of the beam by substantially 90° whereas beam 962 strikes glass region 937 which has no effect on its polarization. The polarizations axes of beams 961 and 962 are now substantially aligned in the horizontal direction as shown by polarization state 973. The beams then strike glass region 941 of the polarization diversity element 940 that does not alter the polarization of the beams, causing them to pass through the second Wollaston prism 945 undeflected and forming a pair of beams 965 which are substantially horizontally polarized.

Similarly, in FIG. 42, a beam 980 from input port 902 is split into two substantially orthogonally polarized beams 981 and 982 by prism 925. The polarization direction of the beams is substantially equalized by polarization diversity element 935 to give the polarization state 993. Both beams 981 and 982 then impinge on a quartz region 942 of the polarization diversity element 940, which rotates their polarization axes to be substantially vertical as shown in polarization state 994. The second prism 945 then causes the pair of vertically polarized beams 985 to be deflected in the vertical direction (the y-axis of 3-axis 999) as shown in FIG. 40.

Referring back to FIG. 39, it is seen that backward propagating beams through the series of polarization elements 915 do not see the polarization rotation element 940. Instead, they are incident on a λ/4 waveplate 943 which transforms the linearly polarized beam (either vertical or horizontal) into a circularly polarized (left- or right handed) beam. This effectively means that a beam of arbitrary polarization can be directed to any of the output ports; however the tradeoff is a signal power loss of 3 dB when recombining the beams with Wollaston prism 925 to be focused into the output ports.

The operation of the device shown in FIG. 38 as a 4×4 reconfigurable wavelength selective OXC will now be described by first considering two of the input ports and describing the operation as a 2×4 OXC using input optical ports 1 and 3 (901 and 903 of FIG. 39). The operation of the 2×4 OXC using input optical ports 2 and 4 (902 and 904 of FIG. 39) is substantially identical in that the beams are directed to the same positions, however the actual displacement of the beams from the input ports differs by the spatial separation between input ports 1 and 2 (901 and 902 of FIG. 39) which in the following example is 250 μm.

Consider a single wavelength channel arriving as part of an optical signal delivered to the device on both input ports 1 and 3 (ie optical ports 901 and 903 of FIG. 39). The two input ports are separated by a known distance (for example 500 μm) which is designed to be the same distance between the optical output and null ports (ie 500 μm). The beams are tagged into the first optical group and are projected to the OPMC device where they fall on the same independently controllable zone. Where it is desired that only one of the signals, say that from input 1, is needed to be output, the technique is analogous to that described earlier in reference to FIGS. 9-12. A phase ramp is applied to the respective zone of the OPMC to direct the desired signal to the desired output port. By the symmetry of the optical system, the spatial separation at the optical port array is maintained such that the focused images of the two signals after reflection from the OPMC device are separated by 500 μm (in the present example). Since the two input ports are separated by the same distance as that between an output port and its neighboring null port, the wavelength channel originating from the second input port (in this example, from input 2) is, by the symmetry of the optical system, directed to one of the null ports.

The set up of the 'Bar' and 'Cross' states (analogous to FIGS. 20 and 21 respectively), becomes more complicated due to the number of possible combinations that must be considered. There are 6 coupling configurations for the 'Bar' state:

[Input 1: Input 3 Output 1: Output 2];
[Input 1: Input 3 Output 1: Output 3];
[Input 1: Input 3 Output 1: Output 4];
[Input 1: Input 3 Output 2: Output 3];
[Input 1: Input 3 Output 2: Output 4];
[Input 1: Input 3 Output 3: Output 4];

and 6 'Cross' state couplings:

[Input 1: Input 3 Output 2: Output 1];
[Input 1: Input 3 Output 3: Output 1];
[Input 1: Input 3 Output 4: Output 1];
[Input 1: Input 3 Output 3: Output 2];
[Input 1: Input 3 Output 4: Output 2];
[Input 1: Input 3 Output 4: Output 3].

The technique for creating each of these coupling situations is similar to that described earlier in reference to FIGS. 13-16 and FIGS. 27-32, ie initially setting up a phase ramp on the corresponding zone on the OPMC to direct the zeroth order of the light to an intermediate point between the desired output ports and applying a periodic modulation to the phase ramp such that most of the energy lies in the first order reflected beams. The angular separation of the first order beam is selected such that the desired state is created.

Figure 43:
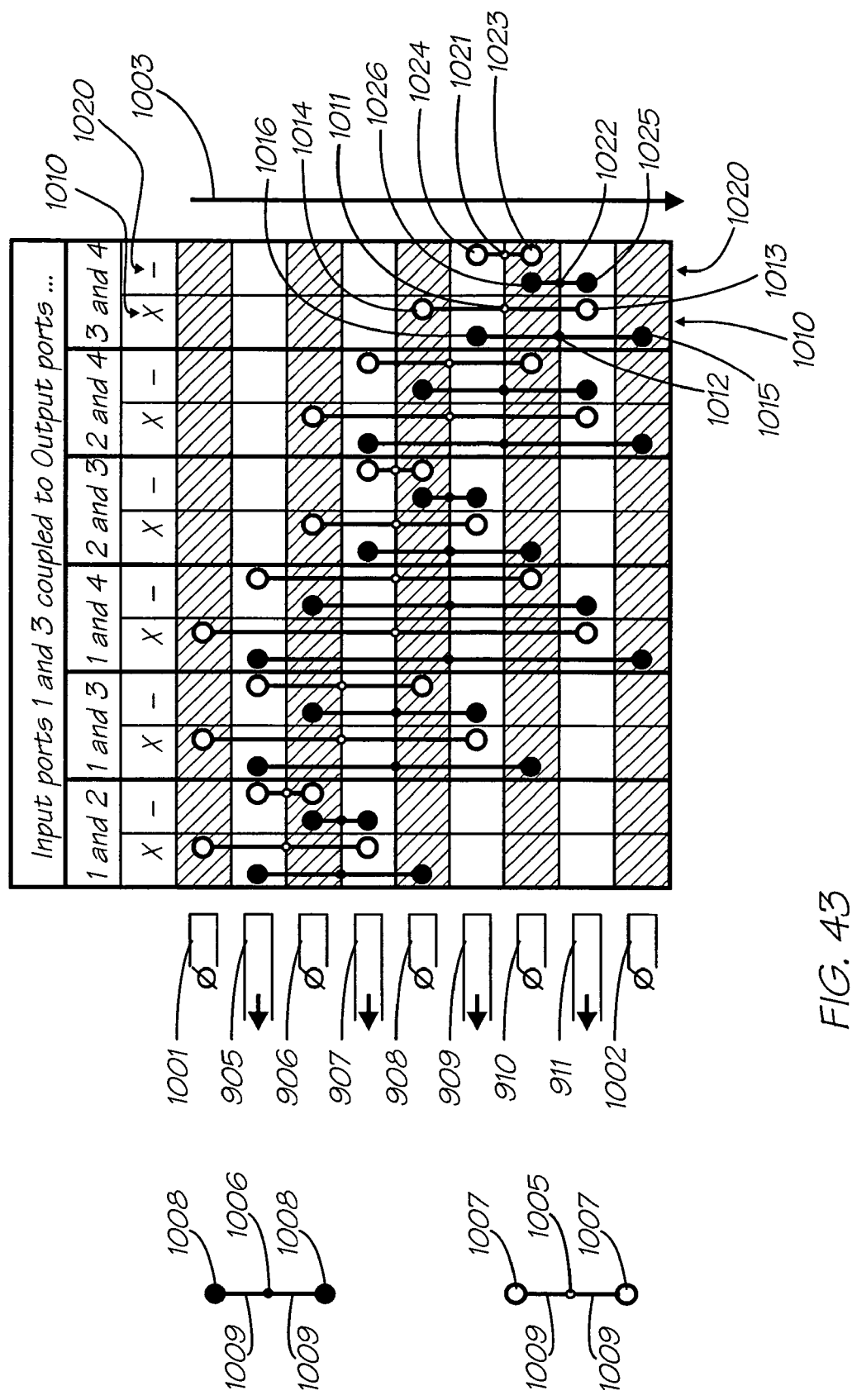
FIG. 43 is a table indicating the required switch positions to generate the 'Cross' and 'Bar' states for all combinations between two inputs and four outputs.

FIG. 43 shows a Table indicating the coupling states of a 2×4 OXC and the location of the reflected signals in order to create each of those states. In FIG. 43, the vertical axis 1003 is regarded as displacement from the input ports (not shown) and it is assumed that the beams are focused onto either the output or null port as required. Optical output ports 905, 907, 909 and 911 and Null ports 906, 908 and 910, similar to those ports with corresponding reference numbers in FIG. 39, are shown. Null ports 1001 and 1002 need not be physical ports and should be considered as only a displacement from the optical input ports. It is possible that a null port can coincide with an input port (ie null port 1001 would coincide with input port 904 as shown in FIG. 39), however signals being output on these ports can easily be removed by known techniques (such as circulators). All ports 905-911, 1001 and 1002 are spaced in this example by 500 μm.

The zeroth-order displacement positions in FIG. 43 are shown for signal from input port 1 as a small open circle eg. 1005 and for signals from input port 3 and a small closed circle eg. 1006. The first-order beams from input port 1 are shown with a large open circle eg. 1007 and from input port 3 as a large closed circle 1008. First-order beams from the same input are linked by a line eg. 1009.

By example, the 'Cross' and 'Bar' states will be described for coupling of light between inputs 1 and 3 and outputs 3 and 4 (corresponding to optical output ports 909 and 911). For the 'Cross' state 1010, the initial phase ramp is constructed on the corresponding zone of the OPMC device such that input 1 is directed to a position 1011 intermediate output 3 (909) and null port 910. By symmetry, input 3 is consequently directed to the point 1012 intermediate null port 910 and output 4 (911).

Next a periodic modulation is added to the phase ramp on the OPMC which directs most of the optical power in each signal substantially equally between two first-order beams with known angular separation. In this case the separation is such that the two first-order beams from input 1 are directed to positions 1013 and 1014 which correspond to output port 911 and null port 908 respectively. Similarly, the light from input 2 is directed to two beams at positions 1015 and 1016 corresponding to null port 1002 and output port 909 respectively. Thus, light from input 1 is output on optical port 911 (output 4) and light from input port 3 is output on optical port 909 (output 3) thereby setting up a 'Cross' state coupling arrangement between these ports.

For the 'Bar' state 1020 coupling between inputs 1 and 3 and outputs 3 and 4, the initial phase ramp is unchanged such that the initial zeroth-order displacement for inputs 1 and 3 (respectively 1021 and 1022 of FIG. 43) is unchanged, however the period of the additional modulation is altered such that the angular separation between the first order images is reduced by a distance equal to the spatial separation of the optical ports (ie 500 μm). Thus, the two first-order beams from input 1 are directed to positions 1023 and 1024 which correspond to null port 910 and output port 909 respectively. Similarly, the light from input 2 is directed to two beams at positions 1025 and 1026 corresponding to output port 911 and null port 910 respectively. Thus, light from input 1 is output on optical port 909 (output 3) and light from input port 3 is output on optical port 911 (output 4) thereby setting up a 'Bar' state coupling arrangement between these ports.

The 'Cross' and 'Bar' states corresponding to coupling between inputs 1 and 3 and any pair of the available output ports 1 to 4 are shown in FIG. 43 and are created in a similar fashion as already described, with the choice of initial displacement and the angular separation between the two first-order beams deciding which state the 2×4 OXC is in.

A 2×4 OXC using input ports 2 and 4 is described substantially similarly to the above and with reference to FIG. 43 by substituting input ports 2 and 4 for input ports 1 and 3. Both 2×4 OXC devices can operate simultaneously and independently of one another thus creating a 4×4 OXC.

It will be appreciated that the reconfigurable wavelength selective optical cross connects described in connection with the preferred embodiments above are understood to be illustrative and the subject matter herein contained is not to be limited to those specific embodiments. On the contrary, it is intended for the subject matter of the current invention to include all alternatives, modifications and equivalents as can be included within the spirit and full scope of the following claims.

What is claimed is:

1. An optical coupling device including:
   a at least a first input port for delivering an optical input signal beam, said input beam including a plurality of wavelength channels;
   b a plurality of optical output ports;
   c a wavelength dispersion element comprising a series of optical power elements and an optically dispersive element, the wavelength dispersion element spatially separating said plurality of wavelength channels in said optical input signal beam to form a plurality of spatially separated wavelength channel beams in spatially separated elongate bands;
   d an optical phased-matrix coupling device comprising a phase grating structure for independently modifying a phase front of each of said plurality of spatially separated wavelength channel beams in the spatially separated elongate bands such that multiple wavelengths channels are simultaneously and independently switched to at least two of the plurality of optical output ports.

2. An optical coupling device as claimed in claim 1 including at least two output ports wherein a selected fraction of the light in at least one wavelength is coupled to said first output port and simultaneously a fraction of the light is coupled to a second output port.

3. An optical coupling device as claimed in claim 1 wherein said phased-matrix coupling device is a spatial light modulator.

4. An optical coupling device as claimed in claim 3 wherein said spatial light modulator comprises a liquid crystal display device having a series of light modulating pixels formed thereon.

5. An optical coupling device as claimed in claim 1 wherein said spatially separated wavelength channel beams received by said phased-matrix coupling device are in the form of wavelength separated elongated bands.

6. An optical coupling device as claimed in claim 5 wherein said elongate bands are aligned in the plane of said zones.

7. An optical coupling device as claimed in claim 5 wherein said wavelength separated elongated bands are substantially collimated along their major axis and substantially focused along their minor axis.

8. An optical coupling device as claimed in claim 5 wherein the ratio of the width of the major axis to the width of the minor axis of the bands is equal to or greater than 5.

9. An optical coupling device as claimed in claim 7 wherein said phased-matrix coupling device is in the telecentric plane of said wavelength channel beams in said focused axis.

10. An optical coupling device as claimed in claim 1 wherein said wavelength dispersion element is a diffraction grating.

11. An optical coupling device as claimed in claim 1 wherein the optical signals traversing said wavelength dispersion element have substantially aligned polarization.

12. An optical coupling device as claimed in claim 1 including polarization manipulation elements separating light from said optical signal input ports into first and second polarized beams of predetermined polarizations and substantially equalizing the polarizations of said polarized beams to be substantially aligned.

13. An optical coupling device as claimed in claim 12 wherein the light emitted from said optical signal ports passes through a numerical aperture modifying means before traversing said polarization manipulation element.

14. An optical coupling device as claimed in claim 12 including path equalization elements such that the distance traveled by each of said polarized beams through the device is substantially equal.

15. An optical coupling device as claimed in claim 12 wherein said first and second polarized beams are angularly separated.

16. An optical coupling device including wavelength dispersion elements comprising a series of optical power elements and an optically dispersive element and a diffractive optical phase matrix coupling device comprising a phase grating structure, said diffractive optical phase matrix coupling device transforming an input signal into substantially spatially separated elongate bands for processing by said optical phased-matrix processing device and modifying the input signal such that the optical power in a selected wavelength region can be simultaneously coupled in a controllable ratio between at least a first and a second output port.

17. An optical coupling device including wavelength dispersion elements comprising a series of optical power elements and an optically dispersive element and a diffractive optical phase matrix coupling device comprising a phase grating structure, said diffractive optical phase matrix coupling device transforming wavelength signals into substantially spatially separated elongate bands for processing by said optical phased-matrix processing device and modifying an input signal such that the optical power in a selected wavelength region can be simultaneously coupled in a controllable ratio between at least a first output port and a null port.

18. An optical processing device including at least one optical input port, wavelength dispersion means comprising a series of optical power elements and an optically dispersive element, a polarization separation means, a polarization manipulation means, an optical phased-matrix processing means, and a plurality of optical outputs for processing wavelength signals contained in an optical input signal, wherein the wavelength dispersion means transforms said wavelength signals into substantially spatially separated elongate bands for processing by said optical phased-matrix processing means such that, for at least one wavelength, a selected fraction of the light is simultaneously coupled to at least two of the plurality of output ports.

19. An optical processing device as claimed in claim 18 including a plurality of optical input ports and a plurality of optical output ports.

20. An optical device including:
   a a linear array of optical ports, wherein at least one port is configured to launch an input signal into the optical device;
   b a polarization manipulation element to form two angularly separated beams from said input signal wherein the polarization of said beams is substantially orthogonal, and such that the axis of said angular separation is substantially orthogonal to the axis of said array of optical ports;
   c an optical imaging system such that the polarization states substantially spatially overlap simultaneously in time at an optical modulation device; and
   d an optical modulation device including an optical phase matrix coupling device for independently modifying the phase front of each of a plurality of spatially separated wavelength channel beams of the two angularly separated beams such that particular spatially separated wavelength channel beam are directionally controlled by said optical imaging system.

21. An optical device as claimed in claim 20 wherein the optical modulation device is an optical phase manipulation device, said phase manipulation device being divided into a plurality of zones.

22. An optical device as claimed in claim 21 wherein said input signal includes a plurality of wavelength channels such that said angularly separated beams each include a plurality of wavelength channels, each said angularly separated beam being further angularly multiplexed with respect to wavelength by an optical dispersion element to form first and second groups of wavelength multiplexed angularly separated beams.

23. An optical device as claimed in claim 22 wherein like wavelengths in said first and second groups of wavelength multiplexed angularly separated beams are directed by said optical elements such that they substantially overlap on one of said zones on said phase manipulation device.

24. An optical device as claimed in claim 20 further including means of substantially equalizing the optical path lengths of said angularly separated beams.

25. An optical device as claimed in claim 24 wherein said path equalizing means includes birefringent optical elements, prisms, transparent optical materials with a refractive index greater than 1, optical power elements, and optical reflecting elements.

* * * * *